United States Patent
Fowler et al.

(10) Patent No.: US 10,839,325 B2
(45) Date of Patent: Nov. 17, 2020

(54) EFFICIENCY ENHANCEMENTS IN TASK MANAGEMENT APPLICATIONS

(71) Applicant: Microsoft Technology Licensing, LLC, Redmond, WA (US)

(72) Inventors: Chad Fowler, Memphis, TN (US); Benjamen Ljudmilov Mateev, Berlin (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 594 days.

(21) Appl. No.: 15/450,825

(22) Filed: Mar. 6, 2017

(65) Prior Publication Data
US 2018/0129995 A1  May 10, 2018

Related U.S. Application Data

(60) Provisional application No. 62/418,268, filed on Nov. 6, 2016.

(51) Int. Cl.
*G06Q 10/06* (2012.01)
*G06Q 10/10* (2012.01)
(Continued)

(52) U.S. Cl.
CPC ... *G06Q 10/063116* (2013.01); *G06F 3/0482* (2013.01); *G06F 16/9024* (2019.01);
(Continued)

(58) Field of Classification Search
None
See application file for complete search history.

(56) References Cited

U.S. PATENT DOCUMENTS

| 5,394,549 A | 2/1995 | Stringfellow et al. |
| 6,898,622 B1 | 5/2005 | Malik |

(Continued)

FOREIGN PATENT DOCUMENTS

| CN | 101395567 A | 3/2009 |
| CN | 102147898 | 8/2011 |

(Continued)

OTHER PUBLICATIONS

"Wunderlist: To-Do List & Tasks", https://www.microsoft.com/en-in/store/p/wunderlist-to-do-list-tasks/9wzdncrdfxzs, Retrieved on: Nov. 10, 2016, 5 pages.

(Continued)

*Primary Examiner* — Stephanie Z Delich
(74) *Attorney, Agent, or Firm* — Merchant & Gould P.C.

(57) ABSTRACT

Efficiency improvements for electronic task managers and an improved user experience are realized when more relevant and fewer irrelevant tasks are presented to users and users are given greater control in manipulating those task items. By heuristically determining times, locations, and semantics associated with task relevance and integrating the management of tasks into more applications, the functionality of the systems providing for electronic task management is improved, as computer resources are spent with greater utility to the users and the user experience is improved for the users.

17 Claims, 17 Drawing Sheets

(51) Int. Cl.
  *G06F 16/901* (2019.01)
  *G06F 3/0482* (2013.01)
  *G06F 21/31* (2013.01)
  *G06F 3/0484* (2013.01)
  *G06F 9/451* (2018.01)
  *G06F 16/9032* (2019.01)
  *G06F 40/30* (2020.01)
  *G06F 3/0481* (2013.01)

(52) U.S. Cl.
  CPC ....... *G06F 21/31* (2013.01); *G06Q 10/06311* (2013.01); *G06Q 10/06312* (2013.01); *G06Q 10/06314* (2013.01); *G06Q 10/107* (2013.01); *G06Q 10/109* (2013.01); *G06Q 10/1093* (2013.01); *G06Q 10/1095* (2013.01); *G06Q 10/1097* (2013.01); *G06F 3/0484* (2013.01); *G06F 3/04817* (2013.01); *G06F 9/453* (2018.02); *G06F 16/90324* (2019.01); *G06F 40/30* (2020.01)

(56) References Cited

U.S. PATENT DOCUMENTS

| | | | |
|---|---|---|---|
| 6,959,166 B1 * | 10/2005 | Gabai | G09B 5/04 |
| | | | 434/307 R |
| 7,016,855 B2 | 3/2006 | Eaton et al. | |
| 7,035,901 B1 | 4/2006 | Kumagai et al. | |
| 7,233,229 B2 | 6/2007 | Stroupe et al. | |
| 7,349,920 B1 | 3/2008 | Feinberg et al. | |
| 7,363,294 B2 | 4/2008 | Billsus et al. | |
| 7,543,237 B2 | 6/2009 | Kontny et al. | |
| 7,548,895 B2 | 6/2009 | Pulsipher et al. | |
| 7,685,414 B1 | 3/2010 | Appenzeller et al. | |
| 7,773,377 B2 | 8/2010 | Feague et al. | |
| 7,817,796 B1 * | 10/2010 | Clippinger | H04M 3/5191 |
| | | | 379/265.12 |
| 7,941,761 B2 | 5/2011 | Hally et al. | |
| 8,069,422 B2 | 11/2011 | Sheshagiri et al. | |
| 8,185,427 B2 | 5/2012 | Messer et al. | |
| 8,185,944 B2 * | 5/2012 | Schnackenberg | H04L 63/105 |
| | | | 713/151 |
| 8,201,176 B2 | 6/2012 | Tatsubori et al. | |
| 8,375,320 B2 | 2/2013 | Kotler et al. | |
| 8,528,059 B1 * | 9/2013 | Labana | H04L 63/08 |
| | | | 726/5 |
| 8,560,371 B2 | 10/2013 | Levitt et al. | |
| 8,587,793 B2 | 11/2013 | Naito et al. | |
| 8,949,275 B1 | 2/2015 | Aasuri-Maringanti | |
| 8,990,143 B2 | 3/2015 | Hohndel et al. | |
| 9,008,631 B2 | 4/2015 | Small et al. | |
| 9,111,291 B2 | 8/2015 | Lempel et al. | |
| 9,122,542 B1 | 9/2015 | Nelissen | |
| 9,313,162 B2 | 4/2016 | Kumar et al. | |
| 9,460,422 B2 | 10/2016 | Reter et al. | |
| 9,658,872 B1 * | 5/2017 | Hanna | G06F 9/45558 |
| 9,832,149 B2 | 11/2017 | Uraizee et al. | |
| 2002/0010746 A1 | 1/2002 | Jilk, Jr. et al. | |
| 2002/0061741 A1 | 5/2002 | Leung et al. | |
| 2003/0220937 A1 | 11/2003 | Maeoka et al. | |
| 2004/0059712 A1 | 3/2004 | Dean et al. | |
| 2004/0230636 A1 | 11/2004 | Masuoka et al. | |
| 2004/0249709 A1 | 12/2004 | Donovan et al. | |
| 2005/0108074 A1 | 5/2005 | Bloechl et al. | |
| 2005/0132010 A1 | 6/2005 | Muller | |
| 2005/0192992 A1 | 9/2005 | Reed et al. | |
| 2005/0267770 A1 | 12/2005 | Banavar et al. | |
| 2005/0268303 A1 | 12/2005 | Anderson et al. | |
| 2005/0268306 A1 | 12/2005 | Anspach et al. | |
| 2005/0289470 A1 | 12/2005 | Pabla et al. | |
| 2006/0069599 A1 | 3/2006 | Hatoun et al. | |
| 2006/0069666 A1 | 3/2006 | Burke et al. | |
| 2006/0149677 A1 | 7/2006 | Shahine et al. | |
| 2006/0282298 A1 | 12/2006 | Azvine et al. | |
| 2007/0027732 A1 | 2/2007 | Hudgens | |
| 2007/0244736 A1 | 10/2007 | Johnson | |
| 2008/0005108 A1 | 1/2008 | Ozzie et al. | |
| 2008/0005168 A1 | 1/2008 | Huff et al. | |
| 2008/0034315 A1 | 2/2008 | Langoulant et al. | |
| 2008/0086640 A1 | 4/2008 | Voss et al. | |
| 2008/0126961 A1 | 5/2008 | Naaman et al. | |
| 2008/0178110 A1 | 7/2008 | Hill et al. | |
| 2008/0256061 A1 | 10/2008 | Chang et al. | |
| 2009/0025013 A1 | 1/2009 | Hattori | |
| 2009/0089133 A1 | 4/2009 | Johnson et al. | |
| 2009/0094623 A1 | 4/2009 | Chakra et al. | |
| 2009/0111425 A1 | 4/2009 | Forbes et al. | |
| 2009/0150761 A1 | 6/2009 | Sawicki et al. | |
| 2009/0239552 A1 | 9/2009 | Churchill et al. | |
| 2009/0254824 A1 | 10/2009 | Singh | |
| 2010/0031198 A1 | 2/2010 | Zimmerman et al. | |
| 2010/0037222 A1 | 2/2010 | Tatsubori et al. | |
| 2010/0125548 A1 | 5/2010 | Anzai et al. | |
| 2010/0131961 A1 | 5/2010 | Palmieri | |
| 2010/0169176 A1 | 7/2010 | Turakhia | |
| 2010/0223575 A1 | 9/2010 | Leukart et al. | |
| 2010/0257015 A1 | 10/2010 | Molander | |
| 2010/0287320 A1 * | 11/2010 | Querol | G06F 9/544 |
| | | | 710/260 |
| 2011/0045841 A1 | 2/2011 | Kuhlke et al. | |
| 2011/0131285 A1 | 6/2011 | Liao et al. | |
| 2011/0145823 A1 | 6/2011 | Rowe et al. | |
| 2011/0219433 A1 * | 9/2011 | Albrecht-Buehler | |
| | | | G06F 9/45533 |
| | | | 726/4 |
| 2011/0276396 A1 | 11/2011 | Rathod | |
| 2011/0276896 A1 | 11/2011 | Zambetti et al. | |
| 2011/0283230 A1 | 11/2011 | Gnanasambandam et al. | |
| 2011/0313803 A1 | 12/2011 | Friend et al. | |
| 2012/0095815 A1 | 4/2012 | Glaser | |
| 2012/0117058 A1 | 5/2012 | Rubinstein et al. | |
| 2012/0144281 A1 | 6/2012 | Schechter et al. | |
| 2012/0159536 A1 | 6/2012 | Treacy et al. | |
| 2012/0173520 A1 | 7/2012 | Wu et al. | |
| 2012/0179706 A1 | 7/2012 | Hobbs et al. | |
| 2012/0191694 A1 | 7/2012 | Gardiol et al. | |
| 2012/0197977 A1 | 8/2012 | Nagasaka et al. | |
| 2012/0221384 A1 | 8/2012 | Avadhanam et al. | |
| 2012/0221975 A1 | 8/2012 | Juristovski et al. | |
| 2012/0223890 A1 | 9/2012 | Borovsky et al. | |
| 2012/0242482 A1 | 9/2012 | Elumalai et al. | |
| 2012/0253916 A1 | 10/2012 | Ayloo | |
| 2012/0266174 A1 | 10/2012 | Inoue | |
| 2012/0278120 A1 * | 11/2012 | Insko | G06F 9/4881 |
| | | | 705/7.21 |
| 2012/0278821 A1 | 11/2012 | Tran et al. | |
| 2012/0311585 A1 | 12/2012 | Gruber et al. | |
| 2012/0330702 A1 | 12/2012 | Kowalski et al. | |
| 2013/0006689 A1 | 1/2013 | Kinnear et al. | |
| 2013/0091453 A1 | 4/2013 | Kotler et al. | |
| 2013/0117208 A1 | 5/2013 | Dousse et al. | |
| 2013/0218985 A1 | 8/2013 | Thazhmon et al. | |
| 2013/0268507 A1 | 10/2013 | Macbeth et al. | |
| 2013/0275429 A1 | 10/2013 | York et al. | |
| 2013/0282755 A1 | 10/2013 | Procopio et al. | |
| 2013/0311285 A1 | 11/2013 | Abrol et al. | |
| 2013/0311997 A1 | 11/2013 | Gruber et al. | |
| 2013/0318473 A1 | 11/2013 | Van Os et al. | |
| 2013/0346247 A1 | 12/2013 | Bash et al. | |
| 2013/0346981 A1 | 12/2013 | Johnson et al. | |
| 2014/0033071 A1 | 1/2014 | Gruber et al. | |
| 2014/0081690 A1 | 3/2014 | Winters | |
| 2014/0082521 A1 | 3/2014 | Carolan et al. | |
| 2014/0089822 A1 | 3/2014 | Wu et al. | |
| 2014/0101599 A1 | 4/2014 | Gandhi et al. | |
| 2014/0130060 A1 | 5/2014 | Pope et al. | |
| 2014/0172986 A1 | 6/2014 | Kumar et al. | |
| 2014/0173602 A1 | 6/2014 | Kikin-Gil et al. | |
| 2014/0173625 A1 | 6/2014 | Kumar et al. | |
| 2014/0278513 A1 * | 9/2014 | Prakash | G06Q 30/0601 |
| | | | 705/2 |
| 2014/0317027 A1 | 10/2014 | Elumalai et al. | |
| 2014/0337175 A1 | 11/2014 | Katzin et al. | |

(56) References Cited

U.S. PATENT DOCUMENTS

| | | |
|---|---|---|
| 2014/0365951 A1 | 12/2014 | Fernandes et al. |
| 2015/0006564 A1 | 1/2015 | Tomkins et al. |
| 2015/0095268 A1 | 4/2015 | Greenzeiger et al. |
| 2015/0100503 A1 | 4/2015 | Lobo et al. |
| 2015/0112985 A1* | 4/2015 | Roggero ............. H04L 67/2823 700/736 |
| 2015/0118672 A1 | 4/2015 | Yeskel et al. |
| 2015/0242091 A1 | 8/2015 | Lu et al. |
| 2015/0269508 A1 | 9/2015 | Damboritz et al. |
| 2015/0317582 A1 | 11/2015 | Nath et al. |
| 2016/0071064 A1 | 3/2016 | Itani et al. |
| 2016/0086116 A1 | 3/2016 | Rao et al. |
| 2016/0094499 A1 | 3/2016 | Uraizee et al. |
| 2016/0161280 A1 | 6/2016 | Shahine et al. |
| 2016/0180279 A1 | 6/2016 | Koerner et al. |
| 2016/0203143 A1 | 7/2016 | Kritt et al. |
| 2016/0219003 A1 | 7/2016 | Kumar et al. |
| 2016/0350367 A1 | 12/2016 | Fischer et al. |
| 2016/0379175 A1 | 12/2016 | Bhattacharya et al. |
| 2017/0193835 A1 | 7/2017 | Bonney-Ache et al. |
| 2020/0065139 A1 | 2/2020 | Kumar et al. |

FOREIGN PATENT DOCUMENTS

| | | |
|---|---|---|
| CN | 102253860 | 11/2011 |
| CN | 102521317 A | 6/2012 |
| CN | 102737303 | 10/2012 |
| JP | 2000-029945 | 1/2000 |
| KR | 20120120316 A | 11/2012 |
| WO | 9742568 A1 | 11/1997 |
| WO | 2010010967 A1 | 1/2010 |
| WO | 2012/167168 | 12/2012 |

OTHER PUBLICATIONS

Matteson, Scott, "Organize your Gmail Tasks using the GTasks application", http://www.techrepublic.com/blog/google-in-the-enterprise/organize-your-gmail-tasks-using-the-gtasks-application/, Published on: Apr. 12, 2013, 28 pages.

Miles, Stephanie, "Coolendar—A Better Way to Plan Ahead", http://www.appvita.com/2011/09/15/coolendar-online-scheduling-and-appointment/, Published on: Sep. 15, 2011, 3 pages.

Dube, Ryan, "Coolendar—A Cool Calendar & To-Do List in One", http://www.makeuseof.com/tag/coolendar-calendar-todo-list/, Published on: Sep. 7, 2011, 7 pages.

"Todoist", https://en.todoist.com/, Retrieved on: Nov. 10, 2016, 8 pages.

"Remember The Milk", https://play.google.com/store/apps/details?id=com.rememberthemilk.MobileRTM&hl=en, Published on: Aug. 29, 2016, 3 pages.

Martin, James A., "'Handle' iOS App Mercifully Merges Email, Calendars and Tasks", http://www.cio.com/article/2875912/mobile-apps/handle-ios-app-mercifully-merges-email-calendars-and-tasks.html, Published on: Jan. 27, 2015, 3 pages.

"1Calendar", http://1calendar.appappeal.com/, Published on: Aug. 17, 2011, 12 pages.

PCT International Search Report and Written Opinion Issued in PCT Application No. PCT/US2017/059812, dated Jan. 3, 2018, 12 Pages.

"Analyzing Inter-Application Communication in Android", Erika Chine, Adrienne Porter Felt, Kate Greenwood and David Wagner, Aug. 21, 2012, Proceedings: Proceedings of the 9th International Conference on Mobile Systems, Applications, and Services, 14 pgs.

Keggstra, Greg, "Announcing the OpenID Backplane Protocol Work Group", Aug. 21, 2012, reprinted from the Internet at: http://openid.net/2012/08/21/announcing-the-open id-backplane-protocol-work-group/, 8 pgs.

"AppContracts and Extensions" (Windows Store Apps), Oct. 15, 2012, reprinted from the Internet at: http://msdn.microsoft.com/en-us/library/windows/apps/hh464906.aspx, 4 pgs.

"iOS App Programming Guide", Sep. 19, 2012, reprinted from the Internet at: http://developer.apple.com/library/ios/documentation/iphone/conceptual/iphoneosprogrammingguide/iPhoneAppProgrammingGuide.pdf, 144 pgs.

Abrams, Lawrence, "Flow to open a tile with a different program on your Mac", Bleepingcomputer.com, Oct. 1, 2011, 3 pgs.

Chinese Office Action in Application 201380065290.1, dated Sep. 8, 2017, 12 pages.

Conder, Shane et al., "Quick Tip: Enabling Users to Send Email from Your Android Applications—The Easy Way", Jul. 13, 2010, 34 pgs.

Dunaway, Gavin, "Yahoo! Mail Beta Uses Email Keywords for Ad Targeting"—7 pages, Published Date: May 23, 2011, http://www.adotas.com/2011/05/yahoo-mail-beta-uses-email-keywords-for-ad-targeting/.

European Communication in Application 13821242.8, dated Jul. 21, 2015, 2 pgs.

Hoffman, "An Introduction to Charms in Windows 8: What they are and How to Use them", obtained online at: http://www.howtogeek.com/114341/an-introduction-to-charms-in-windows-8-what-they-ar . . . , May 2012, 8 pages.

MacManus, Richard, "email Ads Within Email Thread—Is This New?"—Published Date: Sep. 6, 2009, http://www.readwriteweb.com/archives/gmail_ads_within_email_thread_-_is_this_new.php, 2 pgs.

Ongtang, M. et al., "Semantically Rich Application—Centric Security in Android", The Pennsylvania State University, Dept. of Science and Engineering, 2009, 10 pages.

PCT International Search Report cited in PCT Application No. PCT/US2013/075182 dated Mar. 18, 2014, 8 pgs.

Piggyback e-mail—Published Date: Feb. 11, 2005, http://www.webopedia.com/TERM/P/piggyback_e_mail.html, 2 pages.

U.S. Appl. No. 13/713,279, Amendment and Response filed Nov. 13, 2015, 11 pgs.

U.S. Appl. No. 13/713,279, Amendment and Response filed Jul. 27, 2015, 12 pgs.

U.S. Appl. No. 13/713,279, Notice of Allowance dated Dec. 7, 2015, 7 pgs.

U.S. Appl. No. 13/713,279, Office Action dated Mar. 25, 2015, 18 pgs.

U.S. Appl. No. 13/713,279, Office Action dated Aug. 13, 2015, 7 pgs.

U.S. Appl. No. 13/713,375, Amendment and Response filed Dec. 22, 2016, 16 pgs.

U.S. Appl. No. 13/713,375, Amendment and Response filed Mar. 15, 2016, 13 pgs.

U.S. Appl. No. 13/713,375, Amendment and Response filed Apr. 6, 2015, 15 pgs.

U.S. Appl. No. 13/713,375, Amendment and Response filed May 19, 2017, 18 pages.

U.S. Appl. No. 13/713,375, Amendment and Response filed Sep. 8, 2015, 13 pgs.

U.S. Appl. No. 13/713,375, Office Action dated Jan. 19, 2017, 16 pgs.

U.S. Appl. No. 13/713,375, Office Action dated Oct. 15, 2015, 17 pgs.

U.S. Appl. No. 13/713,375, Office Action mailed Nov. 5, 2014, 16 pgs.

U.S. Appl. No. 13/713,375, Office Action dated Jun. 24, 2016, 18 pgs.

U.S. Appl. No. 13/713,375, Office Action dated Jun. 25, 2015, 16 pgs.

U.S. Appl. No. 13/713,375, Office Action dated Jul. 28, 2017, 17 pages.

U.S. Appl. No. 15/087,266, Office Action dated Aug. 18, 2017, 13 pages.

Williams, Ty, "Setting up payment options in BlackBerry App World", Apr. 2011, obtained online at: http://helpblog.blackberry.com/2011/04/app-world-payment-options/, 4 pages.

Japanese Notice of Rejection in Application 2015-548021, dated Oct. 20, 2017, 4 pgs.

U.S. Appl. No. 15/087,266, Amendment and Response filed Jan. 17, 2018, 13 pages.

(56) References Cited

OTHER PUBLICATIONS

U.S. Appl. No. 13/713,375, Amendment and Response filed Nov. 28, 2017, 14 pages.
U.S. Appl. No. 13/713,375, Office Action dated Dec. 29, 2017, 15 pages.
U.S. Appl. No. 13/713,375, Amendment and Response filed Mar. 29, 2018, 14 pages.
U.S. Appl. No. 13/713,375, Supplemental Amendment and Response filed Mar. 30, 2018, 14 pages.
"Non Final Office Action Issued in U.S. Appl. No. 13/713,375", dated Feb. 26, 2019, 15 Pages.
"Final Office Action Issued in U.S. Appl. No. 15/450,874", dated Feb. 7, 2019, 22 Pages.
"Final Office Action Issued in U.S. Appl. No. 13/713,375", dated Jul. 11, 2018, 16 Pages.
"Second Office Action Issued in Chinese Patent Application No. 201380065290.1", dated May 3, 2018, 5 Pages.
"Second Office Action Issued in Chinese Patent Application No. 201380065593.3", dated Apr. 10, 2018, 11 Pages.
Dixa, et al., "From the Web of Data to a World of Action", In Proceedings of the Journal of the Web Semantics: Science, Services and Agents on the World Wide Web, vol. 8, Issue 4, Nov. 1, 2010, 15 Pages.
"International Search Report and Written Opinion Issued in PCT Application No. PCT/US2017/059636", dated Jan. 8, 2018, 10 Pages.
"Non Final Office Action Issued in U.S. Appl. No. 15/450,874", dated Sep. 21, 2018, 24 Pages.
"Chinese 1st Office Action in Application 201380065593.3, dated Jun. 14, 2017, 15 pgs."
"European Extended Search Report in Application 13818562.4, dated May 13, 2016, 8pgs."
"European Office Action in Application 13818562.4, dated Oct. 18, 2017, 8 pages."
"Haas, et al., "CONTASK—Using Context-Sensitive Assistance to Improve Task-Oriented Knowledge Work", Proceedings of the 12th International Conference on Enterprise Information Systems, vol. 2, 10 pages (Jun. 8, 2010)."
"Japanese Office Action in Application 2015-547546, dated Aug. 28, 2017, 6 pages."
"PCT International Preliminary Report on Patentability in Application PCT/US2013/074697, dated Jun. 25, 2015, 7 Pages."
"PCT International Search Report & Written Opinion for Application PCT/US2013/074697, dated Jun. 30, 2014, 10 Pages."
"U.S. Appl. No. 13/715,434, Amendment and Response filed Dec. 26, 2014, 20 pages."
"U.S. Appl. No. 13/715,434, Amendment and Response filed Dec. 28, 2016, 16 pages."
"U.S. Appl. No. 13/715,434, Amendment and Response filed Apr. 4, 2016, 14 pages."
"U.S. Appl. No. 13/715,434, Amendment and Response filed Aug. 24, 2015, 15 pages."
"U.S. Appl. No. 13/715,434, Office Action dated Nov. 3, 2015, 28 pages."
"U.S. Appl. No. 13/715,434, Office Action dated Feb. 8, 2017, 30 pages."
"U.S. Appl. No. 13/715,434, Office Action dated Apr. 22, 2015, 28 pages."
"U.S. Appl. No. 13/715,434, Office Action dated Jul. 28, 2016, 29 pages."
"U.S. Appl. No. 13/715,434, Office Action dated Aug. 27, 2014, 24 pages."
"U.S. Appl. No. 15/087,266, Office Action dated Feb. 14, 2018, 14 pages."
"PCT International Search Report and Written Opinion Issued in PCT Application No. PCT/US2017/059633, dated Jan. 3, 2018, 12 Pages."
"PCT International Search Report and Written Opinion Issued in PCT Application No. PCT/US2017/059634, dated Jan. 3, 2018, 12 Pages."

Bellotti et al., "Taking Email to Task: The Design and Evaluation of a Task Management Centered Email Tool", In Proceedings of the SIGCHI Conference on Human Factors in Computing Systems, Apr. 5, 2003, 8 pages.
Dey et al., "CybreMinder: A Context-Aware System for Supporting Reminders", In Proceedings of 2nd international symposium on Handheld and Ubiquitous Computing, Sep. 25, 2000, pp. 172-186.
Dey et al., "Towards a Better Understanding of Context and Context-Awareness", In Proceedings of 1st international symposium on Handheld and Ubiquitous Computing, Sep. 27, 1999, 12 pages.
"Identify the Context", In Journal of IEEE Professional Communication Society, Apr. 11, 2016, 3 pages.
Lida et al., "Breadcrumb Navigation: An Exploratory Study of Usage", http://usabilitynews.org/breadcrumb-navigation-an-exploratory-study-of-usage/, Published on: Feb. 11, 2003, 6 pages.
"Task Management Made Delightfully Simple", https://hitask.com/, Retrieved on: Nov. 10, 2016, 5 pages.
"Ticktick—Your Lightweight Task Manager", https://ticktick.com/, Retrieved on: Nov. 10, 2016, 4 pages.
U.S. Appl. No. 15/450,521, filed Mar. 6, 2017 entitled "Efficiency Enhancements in Task Management Applications".
U.S. Appl. No. 15/450,714, filed Mar. 6, 2017 entitled "Efficiency Enhancements in Task Management Applications".
U.S. Appl. No. 15/450,758, filed Mar. 6, 2017 entitled "Efficiency Enhancements in Task Management Applications".
U.S. Appl. No. 15/450,874, filed Mar. 6, 2017 entitled "Efficiency Enhancements in Task Management Applications".
"Wunderlist—Keep your life in sync", https://www.wunderlist.com/, Retrieved on: Nov. 10, 2016, 5 pages.
"Non Final Office Action Issued in U.S. Appl. No. 15/450,714", dated May 16, 2019, 13 Pages.
"Non Final Office Action Issued in U.S. Appl. No. 15/450,874", dated Apr. 29, 2019, 39 Pages.
"Notice of Allowance Issued in U.S. Appl. No. 13/713,375", dated Jul. 15, 2019, 9 Pages.
"Non-Final Office Action Issued in U.S. Appl. No. 15/450,521", dated May 31, 2019, 18 Pages.
"Non Final Office Action Issued in U.S. Appl. No. 15/450,758", dated Jun. 21, 2019, 13 Pages.
"Office Action Issued in Korean Patent Application No. 10-2015-7015552", dated Dec. 4, 2019, 10 Pages.
"Office Action Issued in European Patent Application No. 13821242.8", dated Nov. 6, 2019, 8 Pages.
"Final Office Action Issued in U.S. Appl. No. 15/450,758", dated Dec. 10, 2019, 11 Pages.
"Final Office Action Issued in U.S. Appl. No. 15/450,714", dated Nov. 29, 2019, 16 Pages.
"Final Office Action Issued in U.S. Appl. No. 15/450,874", dated Nov. 5, 2019, 21 Pages.
"Final Office Action Issued in U.S. Appl. No. 15/450,521", dated Dec. 10, 2019, 20 Pages.
"Non Final Office Action Issued in U.S. Appl. No. 15/450,521", dated Mar. 18, 2020, 8 Pages.
"Non Final Office Action Issued in U.S. Appl. No. 15/450,714", dated Mar. 6, 2020, 8 Pages.
"Non Final Office Action Issued in U.S. Appl. No. 15/450,758", dated Mar. 18, 2020, 9 Pages.
"Non Final Office Action Issued in U.S. Appl. No. 15/450,874", dated Mar. 20, 2020, 18 Pages.
"Office Action Issued in Chile Patent Application No. 201901127", dated May 15, 2020, 15 Pages.
"Notice of Allowance Issued in Korean Patent Application No. 10-2015-7015552", dated May 18, 2020, 4 Pages.
"Final Office Action Issued in U.S. Appl. No. 15/450,521", dated Jul. 6, 2020, 12 Pages.
"Final Office Action Issued in U.S. Appl. No. 15/450,714", dated Jul. 6, 2020, 9 Pages.
"Final Office Action Issued in U.S. Appl. No. 15/450,758", dated Jul. 6, 2020, 13 Pages.
"Final Office Action Issued in U.S. Appl. No. 15/450,874", dated Jul. 7, 2020, 18 Pages.

(56) References Cited

OTHER PUBLICATIONS

"Office Action Issued in European Patent Application No. 17801180.5", dated Jul. 9, 2020, 6 Pages.
"Office Action Issued in European Patent Application No. 17798070.3", dated Jul. 3, 2020, 6 Pages.
"Office Action Issued in Chile Patent Application No. 201901127", dated Aug. 17, 2020, 16 Pages.
"Summon to Attend Oral Proceedings Issued in European Patent Application No. 13821242.8", Mailed Date: Sep. 1, 2020, 10 Pages.

* cited by examiner

INBOX

+ New Event

March 2016
S M T W T F S
28 29 1 2 3 4 5
6 7 8 9 10 11 12
13 14 15 16 17 18 19
20 21 22 23 24 25 26
27 28 29

› Contoso

› Assistant

‹ Kat Email
  kat123@omail
  US Holidays
  Kel and Tim wedding

› Main

More Calendars

| | Today | Day | Workweek | Week | Month | Year | ⋯ |
|---|---|---|---|---|---|---|---|
| March 2016 | | | | | | | |
| | Sunday | Monday | Tuesday | Wednesday | Thursday | Friday | Saturday |
| | 20 | 21 | 22 | 23 | 24 | 25 | 26 |
| | | | | Volunteer Regi | | | |

10a
11a
12p
1p
2p
3:08p
4p
5p
6p
7p

Swim class

Volunteer Registration ●

Sunset:19:28    Sunset:19:28    Sunset:19:31    Sunset:19:32

EFFICIENCY ENHANCEMENTS IN TASK MANAGEMENT APPLICATIONS

CROSS-REFERENCES TO RELATED APPLICATIONS

The present disclosure claims priority to U.S. Provisional Patent Application No. 62/418,268 filed Nov. 6, 2016, the disclosure of which is hereby incorporated by reference in its entirety.

BACKGROUND

Electronic task management systems and applications enable users to track various tasks more efficiently than with hardcopy notes; users can access the same tasks from multiple devices, rearrange the tasks, and share tasks between users remotely. The ease of adding tasks to an electronic task manager, however, can leave users overwhelmed; too many, irrelevant, or contextually inappropriate tasks can distract the user from the tasks that are relevant to the user at a given time and place. The provision of unwanted tasks not only degrades the user experience, but also wastes computing resources that are used to provide tasks that are not wanted by the user that could be used more efficiently for other tasks.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Enhancements to the efficiency of a task management application are discussed herein in relation to systems, methods, and computer readable media that provide such enhancements. Relational data for entities and the context in which users interact with task items, including the productivity applications used to complete task items, are used to provide users with more relevant tasks, fewer irrelevant tasks, and with greater control and convenience in manipulating task items.

In one aspect, a unified interface is provided for accessing and manipulating task items retrieved from multiple task sources. Various credentials are stored to access the task sources, which include username/password pairs, access tokens, and the like. Proxy tasks are created for the tasks discovered from each source and are presented to the user in the unified interface, to interact with the task items. The user interactions are observed and are used to track progress on the task items and report that progress back to the multiple task sources. For example, a user with two calendar applications can have tasks in each calendar presented in one interface, and mark off a given task as complete in the unified interface, and the calendar application from which the given task was discovered will be updated to reflect the completed task noted in the unified interface.

By providing enhanced efficiency for a task management application, not only is the user's experience improved, but the functionality of the device used to provide the task management application is also improved. The device spends computing resources (processor cycles and memory storage space) with greater precision; wasting fewer resources to provide unwanted tasks for the user's consideration.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 3 illustrates an example graphical user interface in which Task List item creation from within a productivity application is shown;

FIG. 4 illustrates a graphical user interface in which a Task List is implemented;

FIGS. 10A and 10B illustrate example user interfaces for a time period view of a set of task items as the time period's task list is constructed;

DETAILED DESCRIPTION

Figure 1:
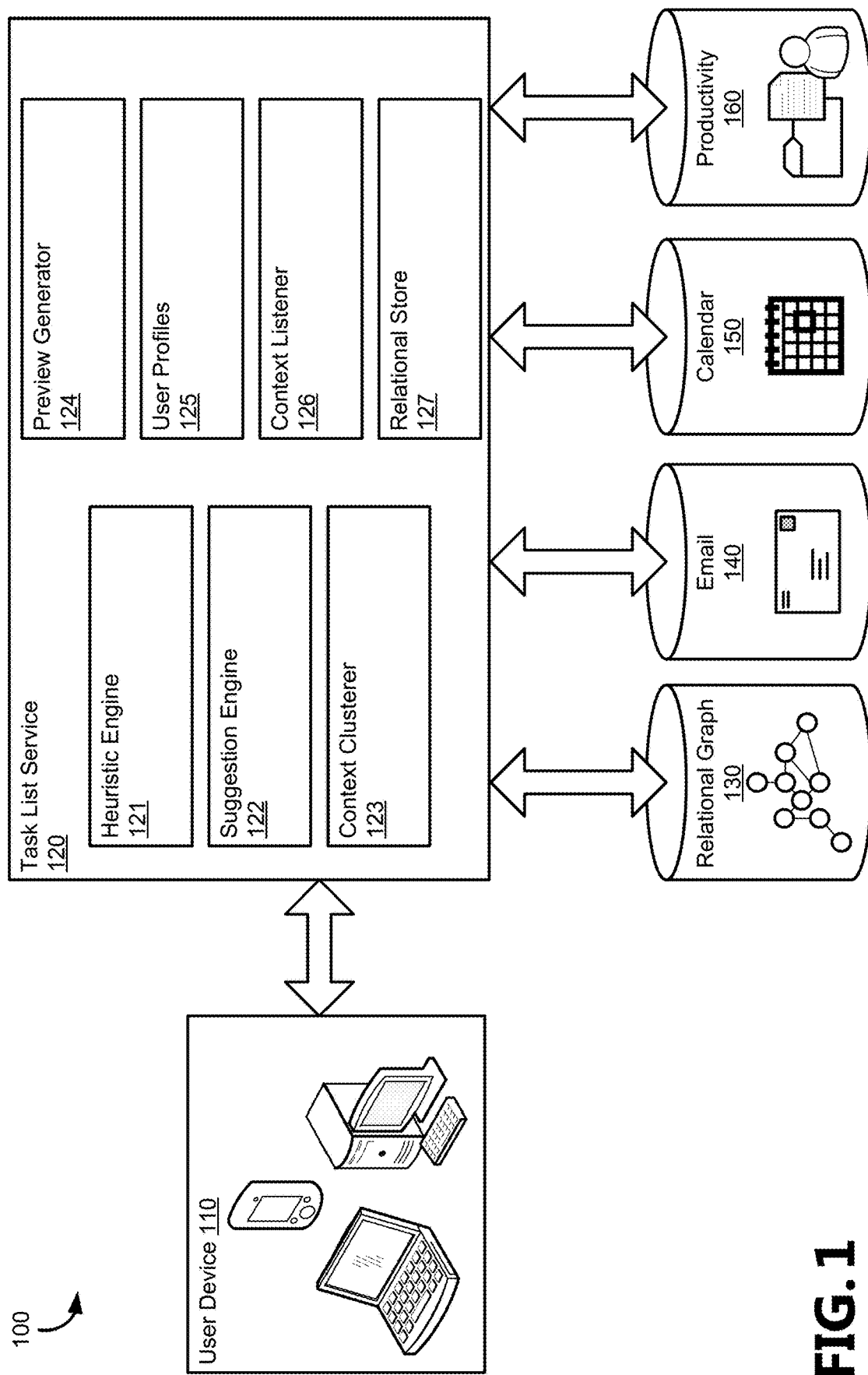
FIG. 1 illustrates an example operating environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Enhancements to the efficiency of a task management application are discussed herein in relation to systems, methods, and computer readable media that provide such enhancements. Relational data for entities and the context in which users interact with task items, including the productivity applications used to complete task items, are used to provide users with more relevant tasks, fewer irrelevant tasks, and with greater control and convenience in manipulating task items.

In one aspect, a unified interface is provided for accessing and manipulating task items retrieved from multiple task sources. Various credentials are stored to access the task sources, which include username/password pairs, access tokens, and the like. Proxy tasks are created for the tasks discovered from each source and are presented to the user in the unified interface, to interact with the task items. The user interactions are observed and are used to track progress on the task items and report that progress back to the multiple task sources. For example, a user with two calendar applications can have tasks in each calendar presented in one interface, and mark off a given task as complete in the unified interface and the calendar application from which the given task was discovered will be updated to reflect the completed task noted in the unified interface.

By providing enhanced efficiency for a task management application, not only is the user's experience improved, but the functionality of the device used to provide the task management application is also improved. The device spends computing resources (processor cycles and memory storage space) with greater precision; wasting fewer resources to provide unwanted tasks for the user's consideration.

FIG. 1 illustrates an example operating environment 100 in which the present disclosure may be practiced. As illustrated, a user device 110 is in communication with a task list service 120. In various aspects, the task list service 120 is hosted on the user device 110, while in other aspects, the task list service 120 is hosted on a remote device as a service accessible by the user device 110. The task list service 120 includes in various configurations one or more of a: heuristic engine 121, a suggestion engine 122, a context clusterer 123, a preview generator 124, user profiles 125, a context listener 126, and a relational store 127. The task list service 120 is in further communication with one or more services that may be hosted on the user device 110 or another device that include, but are not limited to: a relational graph service 130, an email service 140, a calendar service 150, and a productivity service 160. Although only one of each component is illustrated in FIG. 1, it will be appreciated that in different aspects more than one of one or more components are provided (e.g., more than one user device 110 is in communication with the task list service 120, which is in communication with more than one email service 140).

Each of the user device 110, task list service 120, and the services 130-160 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 12, 13A, 13B, and 14. User devices 110 are operated by users, who may be humans or automated systems (e.g., "bots"). In various aspects, the user device 110, task list service 120, and the services 130-160 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The user device 110 is accessed by a user to operate a task list application, among other features and applications. The task list application provides user-specific tasks that the user wishes to be reminded of to complete and tools for manipulating those tasks (e.g., assign task to another user, share task with another user, complete task, mark status of task, add task, remove task). For example, a user may access the task list application to receive a reminder to pay rent on a given set of days, to attend a meeting at a given time, or to go grocery shopping at an undefined time. In various aspects, the task list application is provided by the task list service 120 in a thin client running on the user device 110 in conjunction with a client running on a remote server. In other aspects, the task list application is provided by a task list service 120 running on the user device 110 as a thick client. In yet other aspects, the task list service 120 operates as a distributed system, running on the user device 110 as a thick client when a network connection to the remote server is not available (or not needed) and as a thin client when the network connection is available.

The task list service 120 includes one or more components that may be enabled or disabled as users enable or disable features or network connections to a remote server are established or lost. In various aspects, a task list service 120 local to a given user device 110 may also disable or reduce in size or complexity one or more components compared to a task list service 120 that is accessible over a network by multiple user devices 110.

A heuristic engine 121 is operable to learn user behavior over time to enhance the determinations of which candidate tasks discovered from task sources are to be presented, and in what order, to a given user at a given time and location. The heuristic engine 121 is operable to use one or more machine learning approaches to determine how to best serve the needs and use-cases presented by individual users.

A suggestion engine 122 is operable to determine whether a candidate task received from a tasks source should be suggested to the user as a task to perform at a given time and/or location. From all of the candidate task items that may be presented to the user at any given time, the suggestion engine 122 filters those task items to a manageable subset based on the user's existing task items (to avoid scheduling conflicts), prior acceptances/rejections of suggested task items, and the prior actions of the user. For example, if a user's calendar includes an event for an upcoming birthday, a suggested task is created that the person whose birthday is coming up should be called prior to that date. In another example, where the user sent an email that included a promise to send an attachment by a deadline, a task is suggested to meet this deadline. In a further example, an important meeting is observed on the calendar service 150 as occurring on Friday, and the suggestion service 122 will observe the rest of the week's calendar to determine which days prior to the meeting are likely to allow for a task item to prepare for the important meeting. For example, the task item will be presented on Monday and Thursday, but not Tuesday or Wednesday, due to the number of task items already accepted for on those days (Tuesday and Wednesday being busier or having more task items accepted in the present example than Monday and Thursday).

A content clusterer 123 is operable to cluster tasks and entities that are related in the location, time, and semantics terms that they contain. As will be understood, clustering is a statistical operation that groups items based on shared characteristics (and combinations thereof). In one aspect, tasks interacted with (created/completed) with similar time ranges are clustered together based on similar time characteristics. In another aspect, tasks interacted with (created/completed) when the user is at a given location will be clustered together based on location characteristics. In a further aspect, tasks with similar words, terms, or entities (persons, documents, resources) will be clustered together based on semantic characteristics. For example, the content clusterer 123 is operable to create two clusters of events when it is noticed that a user performs certain tasks when working at a first location during a first time period and performs other tasks when working at a second location during a second time period to inform the heuristic engine 121 that there are two clusters of activity types regularly performed by the user. The content clusterer 123 enables the suggestion engine 122 to provide suggested tasks that are appropriate for a given time and/or location at which those tasks are presented to the user.

For example, the user will be presented with task items related to work on days associated with the work week and business hours, but will be presented with tasks items related to domestic activities (e.g., clean bathroom, go shopping, groom dog) outside of business hours. In another example, the user will be presented with tasks related to work when located at the user's place of work (e.g., detected via Global Positioning System (GPS), Internet Protocol (IP) Location Services, network names in range of the user device 110) and domestic tasks when located at another location (e.g., home, the grocery store, the dog groomer). In various aspects, the suggestion engine 122 will place various weights on clustering determinations that may change over a period of time, so that as time progresses, more or less weight will be given to the clustered content's location, time, or semantic data to allow for blended suggestions. For example, as the workday draws to a close, the user may be presented fewer work related tasks for the day as suggestions, and more domestic related tasks (e.g., "pick up milk on the way home from work"). In another example, when a location or a time period unknown to the content clusterer 123 is observed by the suggestion engine 122, the suggestion engine 122 may rely on the other contextual data used to cluster tasks, such as, when a user is on vacation (in a location previously unknown to the suggestion engine 122), the suggestion engine 122 may rely on time context and semantic context to provide suggestions, and ignore locational context.

A preview generator 124 is operable to generate previews for entities associated with a suggested task (or a selected task). For example, a portion of a document that is to be completed as part of a task is extracted by the preview generator 124 for presentation in a user interface as a preview. In another example, a portion of an audio recording of a phone call that is related to a task is generated as a preview. In a further example, a person who is related to a task (as a resource, an assignor, a teammate, or object of the task) has a preview generated with information from the relational graph service 130, such as, for example, that person's contact information, an image of that person, biographical details of that person, etc.

User profiles 125 are stored by the task list service 120 so that as the behaviors of the users are observed by the heuristic engine 121, the observations are stored to provide an increasingly more accurate view of the user's habits and use patterns for predicting future behaviors. In various aspects, the user or an administrator may also manually set preferences in the user profiles 125 to define how tasks are to be presented to the user and aid the heuristic engine 121 in determining the user's preferences in addition to observing the user's actions to learn those preferences.

A context listener 126 is operable to receive (or request) contextual data and task items from the user device 110 and the services 130-160 for use by the task list service 120. In various aspects, these data include appointments, events, meetings, and tasks set for the user and/or accepted by the user in addition to when and where these appointments, events, meetings, and tasks were set, accepted, worked on, and/or completed. In some aspects, the context listener 126 is operable to provide the state of the computing device (e.g., what applications were active, which application resulted in interacting with the task) to the task list service 120. For example, metadata related to whether a user has looked at a given entity part of a task, how long the user has worked on a given task, how long it took between accepting the task and starting or completing the task, and what interactions were made by the user may be gathered for analysis and reporting.

A relational store 127 stores the relations observed for the creation of task items so that dynamic context can be provided to the user when the task is suggested to the user at a later date. For example, when the user manually or a system automatically creates a task item, the task is parsed to locate entities (e.g., persons involved, objects to be acted on) and recent actions (e.g., actions taken in the last m minutes) that may relate to the task item. For example, if the user receives a message containing the phrase "profit sharing plan" and creates a task that also include that phrase, a relationship between the task and the message will be formed and stored in the relational store 127. In another example, when the user creates a task item to meet with another person, a relationship is formed between the task item, the meeting, and the person so that additional information about the meeting or the person can be recalled (e.g., from the relational graph service 130) when the task item is presented to the user. In various aspects, the node identifiers from the relation graph service 130 for related entities are stored in the relational store 127.

The relational graph service 130 hosts a graph database of a relational graph with nodes describing entities and a set of accompanying properties of those entities, such as, for example, the names, titles, ages, addresses, etc. Each property can be considered a key/value pair—a name of the property and its value. In other examples, entities represented as nodes that include documents, meetings, communication, etc., as well as edges representing relations among these entities, such as, for example, an edge between a person node and a document node representing that person's authorship, modification, or viewing of the document. The relational graph service 130 executes graph queries that are submitted by various users to return nodes or edges that satisfy various conditions (e.g., users within the same division of a company, the last X documents accessed by a given user). In various aspects, the relational graph 130 is in communication with the other services 140-160 to match actions to documents and track edges between nodes representing entities from those other services 140-160.

The email service 140 hosts the email communications for one or more users. In various aspects, the email service 140 is part of or includes a directory service for an organization. In other aspects, the email service 140 is integrated into or accessible by a productivity application of the productivity services 160. For example, an email server storing email messages for an organization is accessible by email applications for members of that organizations and acts as an email service 140 accessible by the task list service 120.

Emails provided from the email service 140 may be added as entities in the relational graph 130, and/or the communications embodied by the emails are treated as edges between communicating parties. In various aspects, emails that are part of the tasks (e.g., "send an email to John Doe") that are monitored by the task list service 120, and also provide context for other tasks, such as, for example, when a task is originated in an email (e.g., an email whose content includes "please review the meeting agenda" originates the task of "review meeting agenda").

The calendar service 150 hosts calendar and appointment information for one or more users. Various appointments, meetings, and events (collectively, events) are stored in the calendar service 150 that include one or more persons as participants/hosts. Events include one or more of: participants (required or optional), attendance information, times, locations, resources, attached documents, and event information (e.g., event title and description). In various aspects, the calendar service 150 is provided in a unified email/calendar application, such as, for example, THUNDERBIRD® (offered by the Mozilla Fnd of Mountain View, Calif.) or GMAIL® (offered by Alphabet Inc. of Mountain View, Calif.), which stores events for a user of that application. In other aspects, the calendar service 150 includes a social media platform, such as, for example, FACEBOOK® (offered by Facebook, Inc. of Menlo Park, Calif.) where various events are posted that users may attend.

Events provided from the calendar service 150 may be added as entities in the relational graph 130, and/or the interactions embodied by the events are treated as edges between interacting parties. In various aspects, events are part of the tasks (e.g., "attend birthday party") that are monitored by the task list service 120, and also provide context for other tasks, such as, for example, when a task is originated in an event (e.g., action items created during a meeting).

The productivity service 160 includes one or more productivity applications and document repositories that are accessible by one or more users. In various aspects, the productivity service 160 is hosted on the user device 110 and/or a remote server accessible by the user device 110. For example, the productivity service 160 includes a locally executed authoring application (e.g., PAGES®, KEYNOTE®, or NUMBERS® offered by Apple, Inc. of Cupertino, Calif.) and remotely executed authoring applications (e.g., the GOOGLE DOCS™ suite offered by Alphabet, Inc. of Mountain View, Calif.) that are accessible via a thin client or web browser. In another example, the productivity service 160 include a library of documents stored on the user device 110 as well as libraries stored on networked computers or as part of a document management system and remote storage locations (e.g., GOOGLE DRIVE™ offered by Alphabet, Inc. of Mountain View, Calif.).

Documents provided from the productivity service 160 may be added as entities in the relational graph 130. In various aspects, documents are part of the tasks (e.g., "edit the quarterly report") that are monitored by the task list service 120, and provide context to report on how tasks have been handled to an initiating or collaborating party. For example, when a manager assigns the task of "edit the quarterly report" to an employee, the manager may receive an indication when the employee has completed the task, and the interactions that comprise that task. Similarly, when a manager assigns the task to a work group of several employees, when one employee assumes the task (e.g., begins work, accepts the task, completes the task), the other employees may be notified that the task has been assumed by their coworker.

In various aspects, the services 130-160 are operable to transmit interactions to the task list service 120 or to have interactions listened to/pulled from the services 130-160 to the task list service 120. An API (Application Program Interface) or agent between the task list service 120 and services 130-160 facilitate communication between the services 130-160 and the task list service 120, ensuring communications are received in a format interpretable by the receiving service. In one example, the SIRI® or GOOGLE NOW® personal digital assistants (offered by Apple, Inc. and Alphabet, Inc., respectively) may parse the sources 130-160 as agents to report relevant data to the task list service 120. In another example, the sources 130-160 are configured to communicate to the task list service 120 as actions are taken in those services 130-160 in a format specified via an API.

FIGS. 2A-10B illustrate various example user interfaces for a task list application employing the tasks list service 120 to improve the efficiency in how tasks are presented to the user. As will be appreciated, FIGS. 2A-10B are provided as non-limiting examples and other arrangements and groupings of user interface elements with different content are included in the concepts of the present disclosure.

Figure 2A:
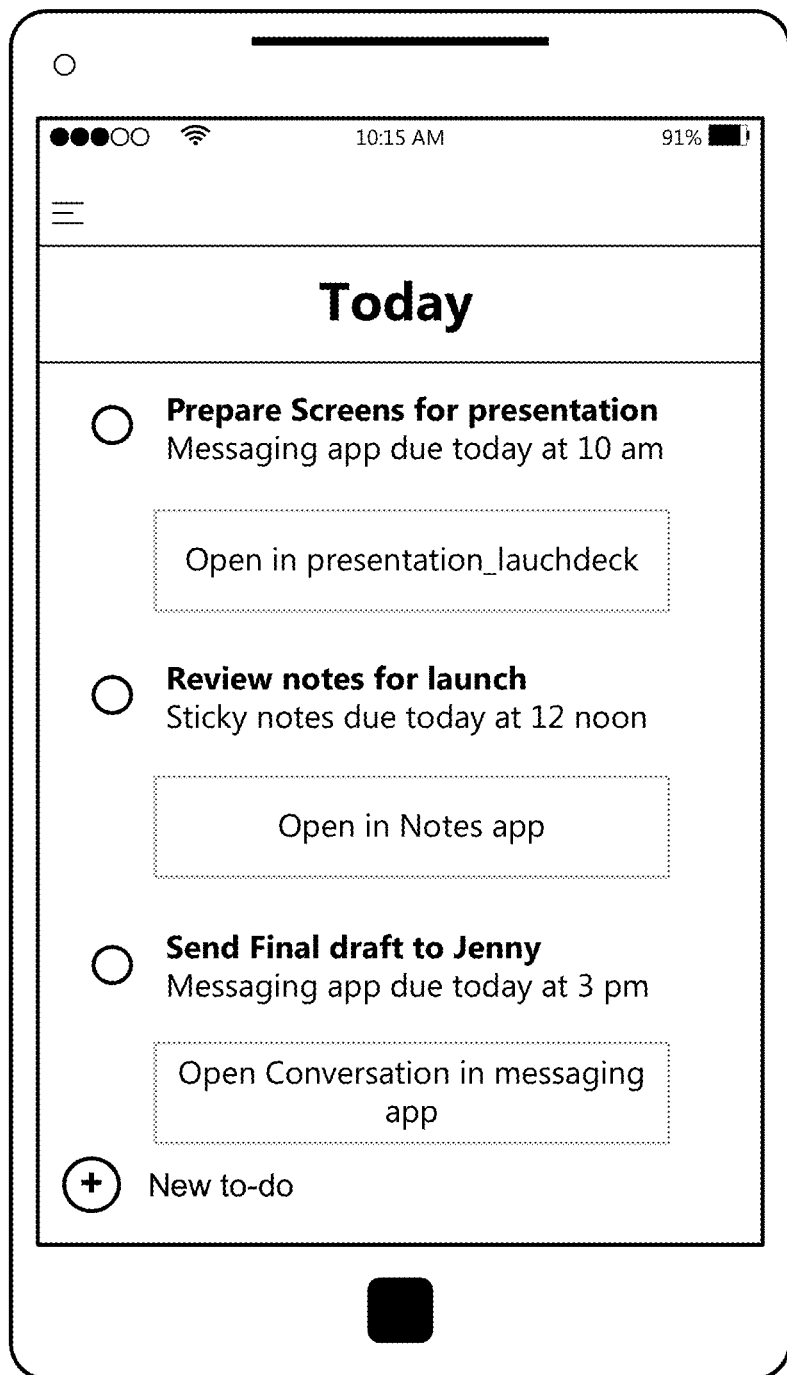
FIGS. 2A and 2B are illustrations of example graphical user interfaces in which a task list is implemented.
Figure 2B:
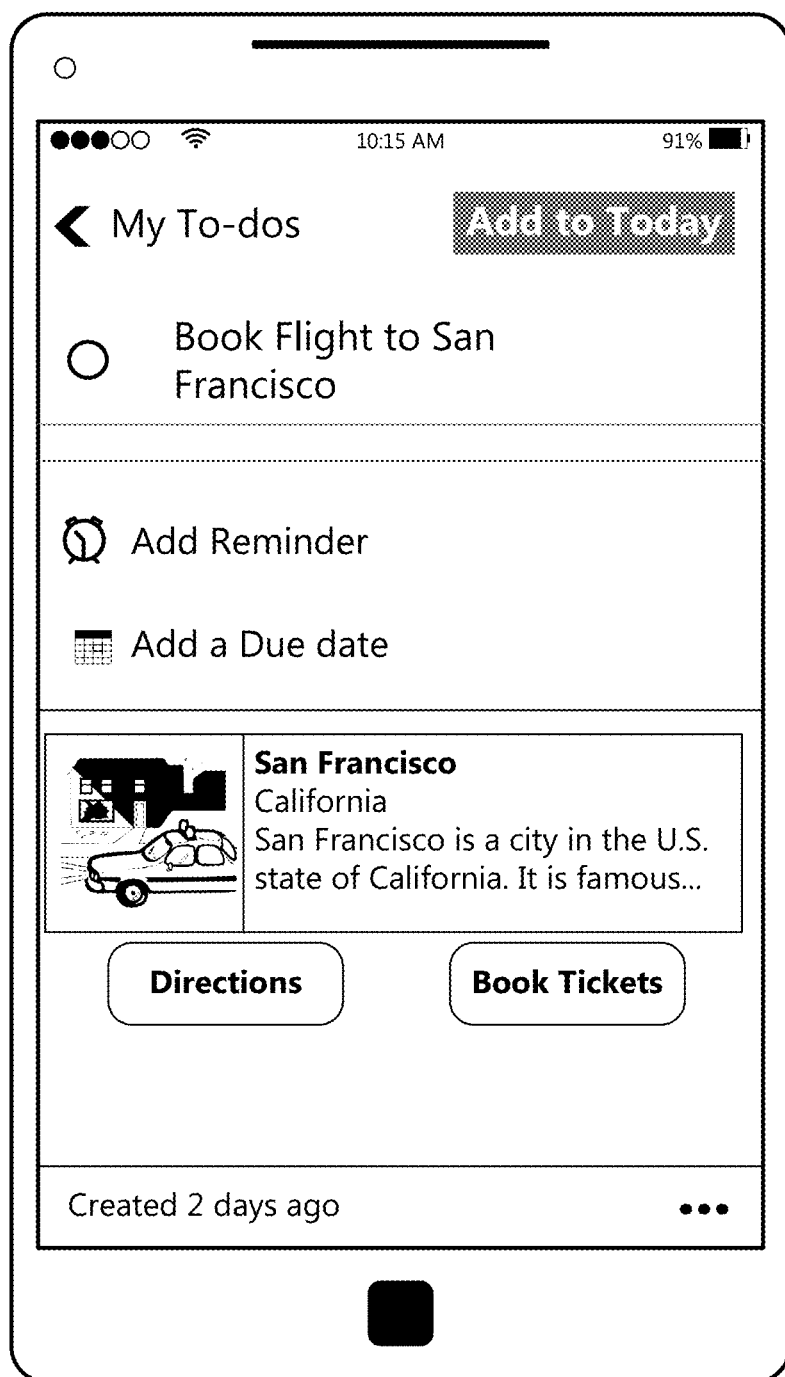

FIGS. 2A and 2B are illustrations of example graphical user interfaces in which a Task List is implemented. The task list user interface illustrated in FIG. 2A displays the scheduled tasks for "today". In one aspect, along with the task item, a link to the application relevant in completing the task item is provided. For example, the second item on the task list user interface displayed in FIG. 2A, is "review notes for launch". A link to the notes application is provided along with the task item to allow the user to access the notes application from the task list application, instead of the user having to search for the application and then open it.

In one aspect, a link to the content item relevant to completing the task item is provided. For example, the first task item is "prepare screens for presentation". The task item is provided along with the content item "product launchdeck" to allow the user to access the content item "product launchdeck" in the presentation application without having to remember the content item and its location to complete the task item "prepare screens for presentation".

In one example, the tasks for "today" are listed in the order of time when they are due. In another example, they are listed in the order of priority. According to an example, the priority is identified by the system. In another example, the user is allowed to provide the priority details when creating the task item.

According to an aspect, the task list user interface illustrated in FIG. 2B displays a suggested task list item. As illustrated, a suggested task list item "Book flight to San Francisco" is provided. According to an aspect, the task is suggested based on user context. User context may be developed by the system gradually by learning user patterns and user interaction data. The option to add the suggested task item to the task list shown in FIG. 2A is provided. According to another aspect, the link provides a brief description of the task list item. For example, as illustrated in FIG. 2B, a brief description of the city of San Francisco is provided along with the suggested task list item "Book flight to San Francisco". In another example, others options such as for example, an option to provide "directions" to the city and an option to "book tickets" are provided.

Figure 3:
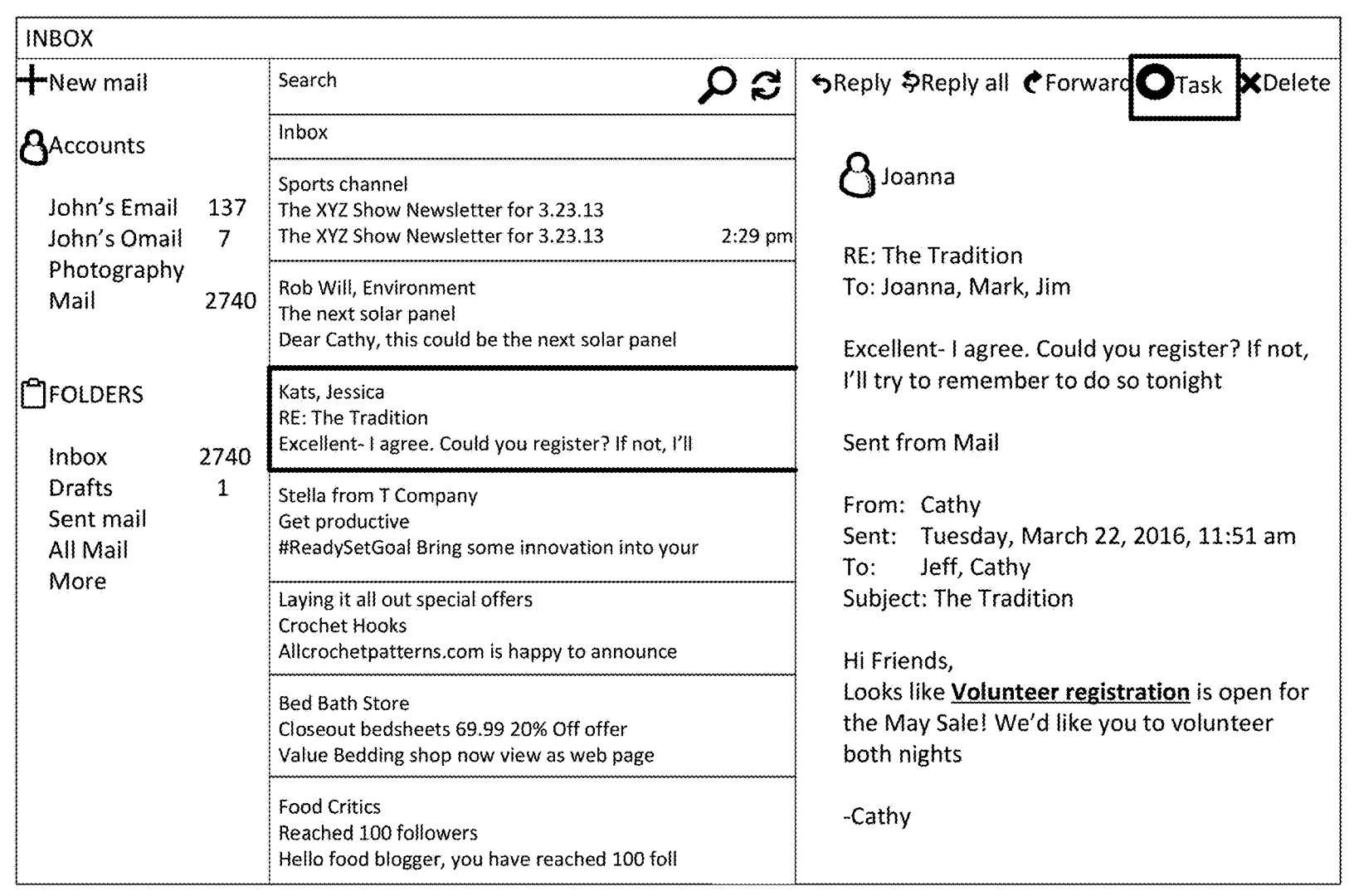

FIG. 3 is an illustration of an example graphical user interface in which Task List item creation from within a productivity application is shown. As is illustrated in FIG. 3, a task creation option is provided in an email productivity application. In one example, the system identifies the "volunteer registration" as an entity possibly related to a task and identifies the candidate time as "tonight" and provides the task creation control. Upon selection of the task creation control, the "volunteer registration" task is created as a task item for "tonight". In another aspect, the user selects the task creation option and identifies the objects, persons, and times relevant to that task. In various aspects, dialogs or prompts are provided to the user to select the values from the productivity application or manually input those values to build the task.

FIG. 4 is an illustration of a graphical user interface in which a Task List is implemented. In one aspect, upon selection of the Task creation option in FIG. 3, the task item is created in relation to the content item from which it was created and is displayed in a calendar. For example, the system identifies the "volunteer registration" task in the email illustrated in FIG. 3 and that the task needs to be completed tonight—relative to the day of creation or a date in the content item. The system creates the task and displays the task in the calendar application as illustrated in FIG. 4 for completion tonight. In one example, the user is provided with an option whether to accept the task or to make any desired changes to the task such as for example, change the date and or time, reassigned the task, etc.

Figure 5:
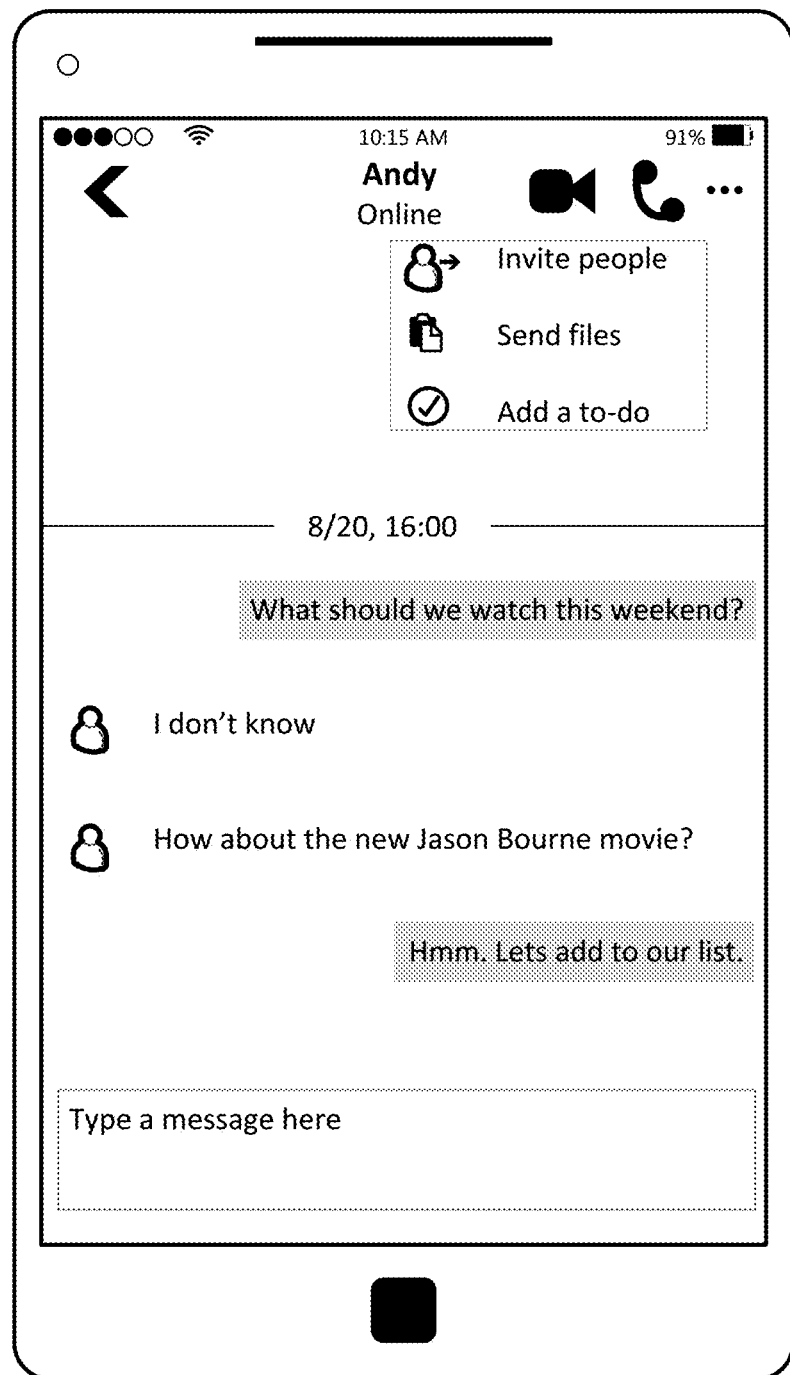
FIG. 5 illustrates a graphical user interface in which an interface to create a task list item is provided within a productivity application, such as a messaging application.

FIG. 5 is an illustration of a graphical user interface in which an interface to create a task list item is provided within a productivity application, such as for example, a messaging application. As illustrated in FIG. 5, an option to create a task list item is provided within a messaging application for a user to select. In one example, once the system identifies a task item is to be created, the productivity application is parsed for relevant objects for inclusion in the task item. For example, a series of messages in a conversation document of a messaging application are parsed to identify objects of "Jason Bourne movie" and a task time "this weekend", to prepopulate a task item. The user is provided an interface to accept or substitute different values for the prepopulated with an option to add the task list item in the task list application.

In another example, once the system identifies a task list item, for example, "Jason Bourne movie" and a task time "this weekend", the system automatically adds the task list item to the tasks list application. Further, in one example, the user visits the task list application and views the task list categories of movies to watch to find the "Jason Bourne movie" task list item and does not remember the context in which the movie was added to the task list. The system may provide a context along with a link to the particular messaging conversation to the user, with the "Jason Bourne movie" task list item, in the task list application.

Figure 6:
FIG. 6 illustrates an additional option for creating a task list item within the example messaging application.

FIG. 6 illustrates and additional option to create a task list item within the messaging application. For example, a user may select an option to add a task item from the productivity application via a control or menu, as illustrated in FIG. 5, or a control may be provided contextually by the task list service 120 within the productivity application in response to the user's actions. For example, as illustrated in FIG. 6, when a user is entering text into a field, a control to create a task based on the contents of the field may be provided so that the user does not need to access a menu or control as part of a ribbon, but instead is provided a contextual control proximate to where the user is interaction with the productivity application.

Figure 7:
FIG. 7 illustrates a graphical user interface in which the creation of a task list item is shown within a communication application, such as, for example, a messaging application.

FIG. 7 is an illustration of a graphical user interface in which the creation of a task list item is shown within a communication application, such as, for example, a messaging application. The system provides an agent which can be added as an entity to the user's contact list. For example, as illustrated in FIG. 7, the user is allowed to create a task list item by sending a message to the task list agent or an agent within the messaging application. Further, the agent sends a message to the user via the messaging application confirming that the task list item has been created. In another aspect, along with the confirmation message, the agent also provides additional information related to the task list item. For example, as illustrated in FIG. 7, when the user requests the agent to create a task to "make a reservation for dinner at the famous restaurant", the system provides a confirmation message, via the messaging application, notifying the user that the task list item has been created along with additional relevant information, such as, for example, a brief review of the restaurant, the timing of the reservation, a rating from a popular review site, a link to access the website of the restaurant, and a link to access directions to the restaurant, etc.

Figure 8:
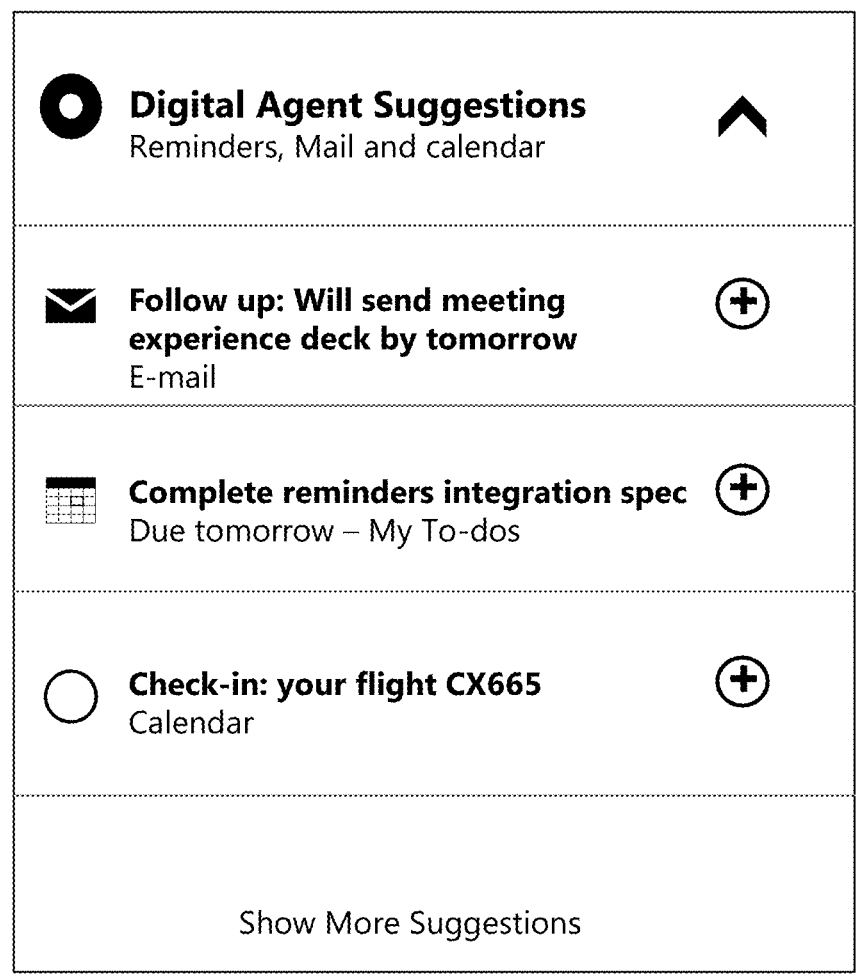
FIG. 8 illustrates various source attributions for suggested tasks items.

FIG. 8 illustrates various source attributions for suggested tasks items. As shown in FIG. 8, the task sources from which suggested tasks are drawn and the agent or suggestion engine 122 that is used to identify those suggested tasks is presented to the user. Various icons and source names are also presented in association with the suggested tasks items to alert the user as to where, and potentially why, a given suggested task item is presented as a suggestion. For example, text from an email message may be extracted as promising a task item that is discovered by a context listener 126 and is therefore presented with an email icon along with the text that cause the context listener 126 to infer that a task item exists. In another example, a task in a user's task list for a later date is presented with a task list icon, and is suggested due to a surplus of inferred time on the user's schedule for the current date (e.g., today is open and the task item is due tomorrow). In a further example, a calendar icon is presented in association with an inferred task list item discovered from a calendar application.

Figure 9:
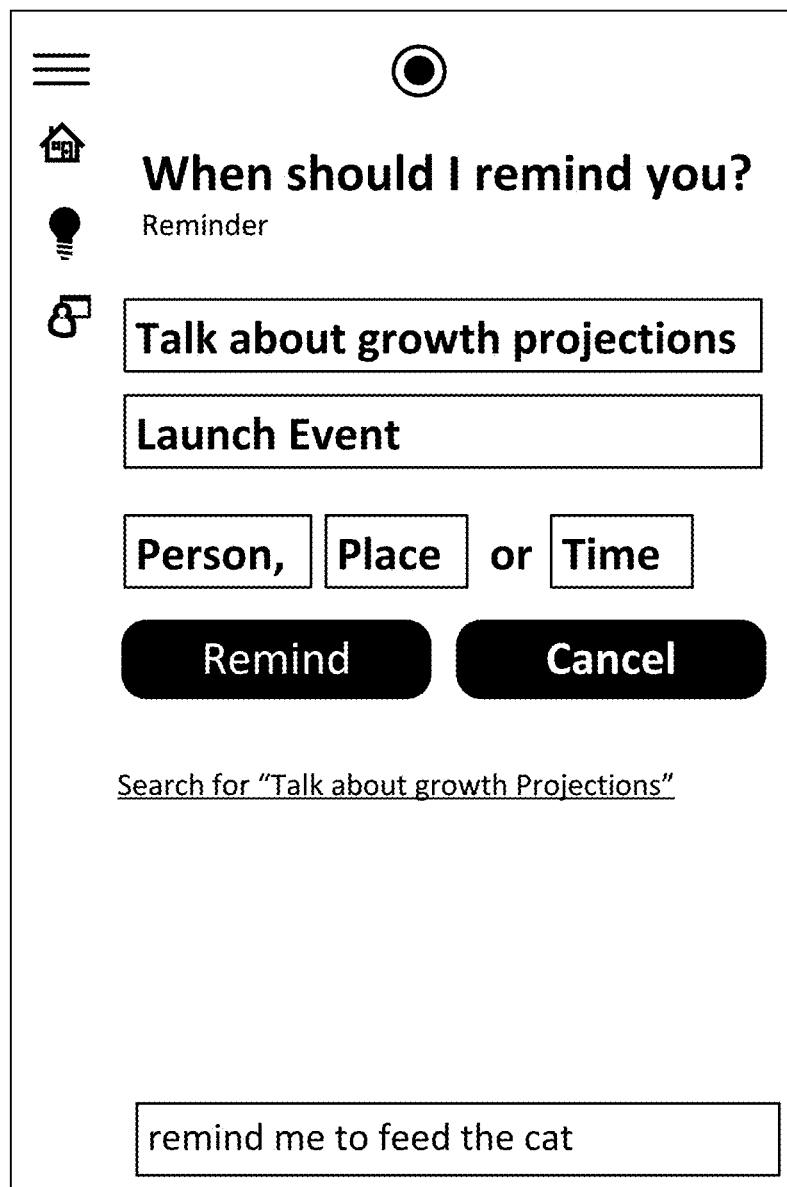
FIG. 9 illustrates an example user interface for a digital assistant to create task items.

FIG. 9 illustrates an example user interface for a digital assistant to create task items. As illustrated in FIG. 9, a digital assistant has been invoked and provides various controls for defining a task item. In various aspects, user input may be received by the digital assistant from input devices such as keyboards, mice, and touch screens, but also from microphones when the digital assistant is operable to interpret speech for content input and commands. The digital assistant may be invoked by the user uttering a command sequence to summon the digital assistant, selecting a control in a user interface, or automatically in response to user actions in a productivity application, task list application, or operating system.

Input fields include, but are not limited to, title, description, persons involved, places involved, and times involved fields. The user is operable to set which task list the task item is added to, or the system may automatically add the task item to a task list according to a determination of common subject matter, time, or location according to a clusterer 123. Additional controls are provided for the user to accept the creation of the task item (e.g., "remind"), reject the creation of the task item (e.g., "cancel"), and to locate additional data related to the task item (e.g., "search for . . . ").

Figure 10A:
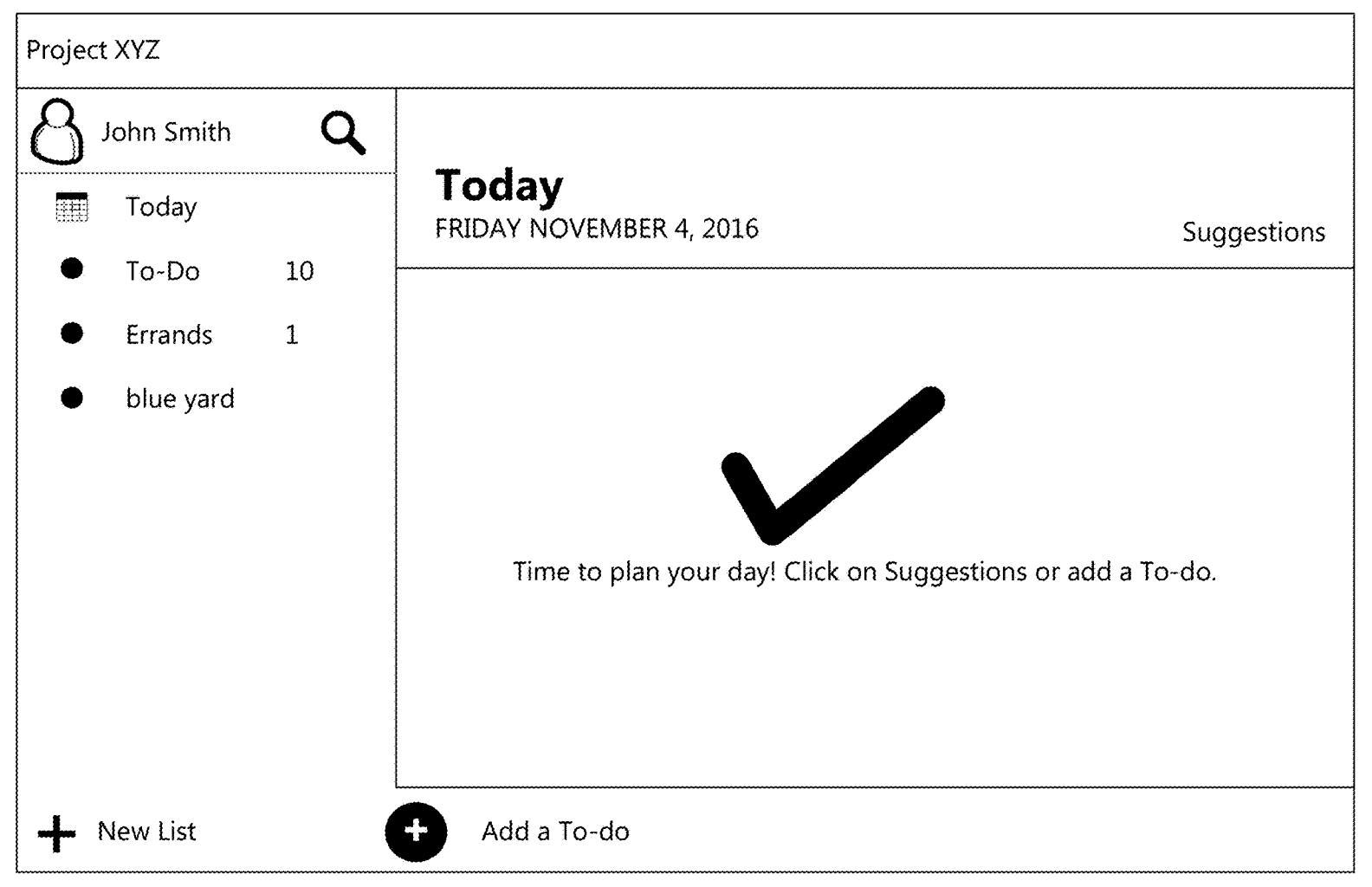
Figure 10B:
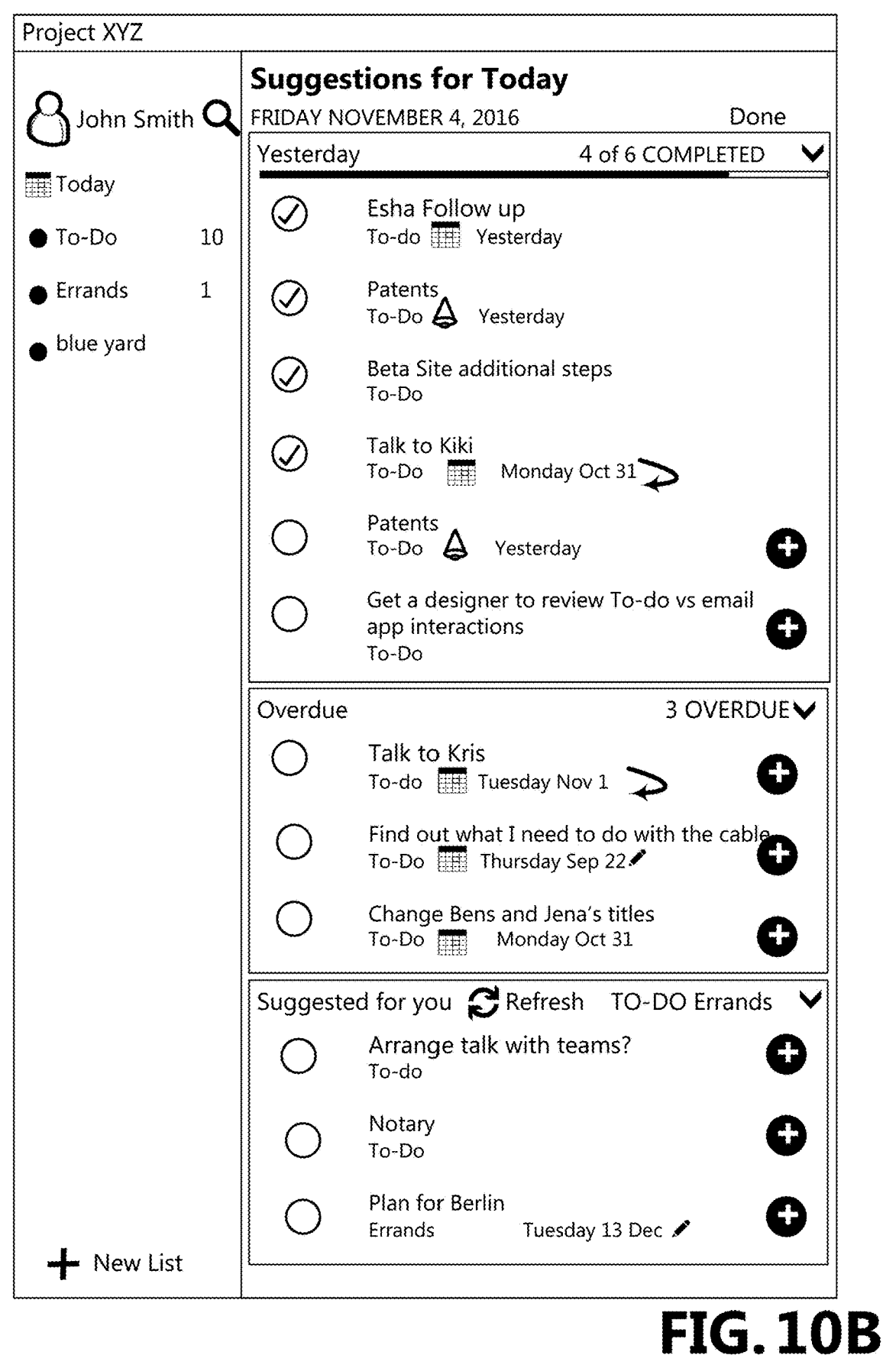

FIGS. 10A and 10B illustrate example user interfaces for a time period view of a set of task items as the time period's task list is constructed. FIG. 10A illustrates a starting position for a time period, a daily task list in the present example, which is blank when the time period list initiates. The blank view allows the user control over which candidate tasks for the day appear on the day's task list; suggested task items are shown but are not included on the list until selected by the user. In various aspects, the blank view is presented to the user at the start of the time period or at the conclusion of the prior time period. Although a user may pre-plan several tasks, in various aspects, the time period view is only accessible in the time period directly before or during the time period associated with the time period list (e.g., that day or the day before for a daily list, at the start of a week or the end of the prior week for a weekly list, etc.).

Proceeding from FIG. 10A, the interface illustrated in FIG. 10B shows several suggested tasks for the time period as they are provided to the user. As shown in an upper portion in the interface, tasks from the prior time period (e.g., yesterday in a daily task list) are shown to the user so that incomplete tasks may be selected for inclusion in the current time period task list or the user is reminded of what was completed tasks were accomplished in the prior time period to create ongoing tasks. As shown in a middle portion of the interface, tasks that are overdue are shown to the user so that overdue tasks items may be selected for inclusion in the current time period task list. As shown in a lower portion of the interface, suggested task items from one or more services 130-160 as selected by a suggestion engine 120 are shown to the user to select from for inclusion in the time period list.

Various details about the suggested task items are shown to the user, including, without limitation: a title, a description, interested or relevant parties (e.g., assignor, assignee, sender, receiver, resource), due dates, start dates, portion already completed, sub-tasks, and related objects. Controls are provided in the interface in association with the suggested tasks to select one or more of the suggested task items to add an existing task list or new task list. Controls are also provided for the user to manually add task items to an existing or new task list. In other aspects, controls are provided to reject suggested task items, and the suggestion engine 122 is operable, in some aspects, to replace the rejected task items with other suggested task items. The heuristic engine 121 is operable to learn the user's behavior based on the user's interactions (e.g., selection, rejecting, ignoring) with the presented task items to improve the task items that the suggestion engine 122 provides.

Figure 11:
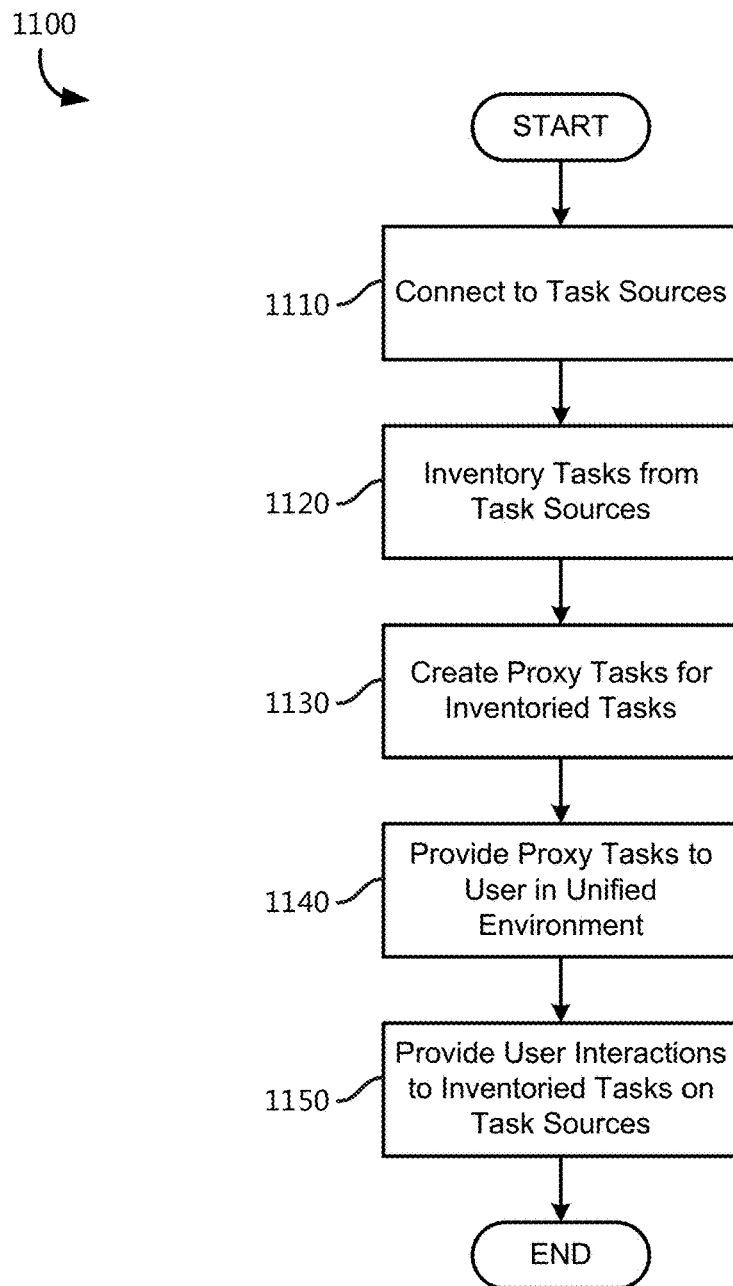
FIG. 11 is a flow chart showing general stages involved in an example method for enhancing efficiency by providing a unified interface for accessing and manipulating task items retrieved from multiple task sources.

FIG. 11 is a flow chart showing general stages involved in an example method 1100 for enhancing efficiency by providing a unified interface for accessing and manipulating task items retrieved from multiple task sources. As users may be assigned tasks in different roles and from different sources, managing those sources and keeping tasks for different roles separate in a task management application can prove difficult. To improve the functionality of the user device 110 in displaying tasks from various sources for various roles, a unified view is provided. Proxies of the tasks from the various sources are shown in the unified view, and are displayed along with indicators for the source from which the task was drawn. The unified view is operable to accept and transmit actions to the tasks (e.g., status updates, completions, reassignments) back to the master task source to handle. In various aspects, the suggestion engine 121 is operable to take the task source into account when presenting or ordering suggested tasks, such that tasks from a first task source are presented with a higher frequency than tasks from a second task source.

Method 1100 begins at OPERATION 1110, where the task list service 120 connects to one or more task sources, such as, for example, an email service 140, a calendar service 150, or a productivity service 160. Depending on the task source that the task list service 120 attempts to connect to, the task list service 120 may use existing connections or authentications with various task sources (e.g., using an access token from logging into an Operating System to access a task source) or store authentication credentials to log into one or more task sources.

In some aspects, sharing credentials and authenticating uses OAuth, or another authentication standard to authorize one system to access other systems and thereby exchange task item related data. For example, a user account for the task list service 120 could authorize a task list service 120, on the user's behalf, to access an external system (e.g., a task source, another task list service 120, etc.). In various aspects, more than one account of a given service may be connected to by the task list service 120, thus allowing a first user to provide one set of authorization credentials to access personally associated tasks and also view/access tasks associated with other users who have given the first user permission to view/access task items associated with them. For example, a set of roommates may connect to their own accounts using their personal authentication credentials as well as their roommate's accounts to share task items between the roommates. The system would not need to store the username/password pairs for each of the roommates (which may expose additional personal data), but the system would be authorized by each roommate to share scheduling data with the other roommates when they logged in (with their own credentials) to the task list service 120.

Once connections to the task sources have been established, method 1100 proceeds to OPERATION 1120, where the task sources are inventoried to discover task items. In various aspects, task items are inventoried by discovering meeting, events, and appointments from a calendar service 150, recently manipulated documents from a productivity service 160, unsent and recently received emails from an email service 140, and task items entered into a task application for the user or another person related to the user according to a relation graph service 130. In additional aspects, documents (including emails, event descriptions, productivity application files, etc.) are parsed to locate actionable requests, such as, for example, an email including the text "please walk the dog when you get home," or an event description including text for "bring a side dish," which are interpreted by the heuristic engine 121 to include task items for the user based on an analysis and understanding of the text of discovered documents. In further aspects, images are analyzed for text via an optical character recognition system, to enhance the abilities of the task list service 120 in identifying task items from the various task sources.

At OPERATION 1130, proxy tasks are created by the task list service 120 from the inventoried tasks for use in a unified view provided by the task list application from the various sources. The task list service 120 maintains, as system of recording, all of the tasks discovered from the various task sources for presentation and use on the user device 110, and maintains references to the discovered tasks as proxy tasks linked to the external systems from which they were generated.

In one aspect, a task management system for the task list service 120 has its own storage for internal task items for individuals and groups, and is connected to various external task sources to include the external tasks found thereon in a unified view for the user. Those external tasks will be referenced in the unified view as proxy tasks, but to actually look up the task items' details and modify those task items, the original task source will be communicated with. The unified view provides the user the ability that when a task view is loaded, it will return tasks from all the systems that have been linked as potentially providing tasks, but when the user modifies proxy tasks in the unified view, the task list service 120 will know where those tasks originate from. The task list service 120 is operable to communicate modifications to proxy tasks to the external task source to handle (instead of attempting to make those modifications to the internal task management system).

For example, a user may primarily rely on a first task list application for work tasks, but primarily rely on a second task list application for personal tasks. The task list service 120 is operable to integrate the tasks from one of the above task list applications into the other (or both into a third) task list application as proxy tasks. The use of proxy tasks allows each task list application to independently maintain its records, and to provide the user with the benefits and features that are unique to one task list application in the other.

Proceeding to OPERATION 1140, the proxy tasks are provided to the user in the unified view. In various aspects, indicia of the source from which the proxy tasks are drawn are indicated in the unified view, and/or hyperlinks are provided to access a program to natively provide the external task item corresponding to the proxy task. For example, a productivity application may be launched via a control in the unified view to access a document from which the proxy task is based.

At OPERATION 1150, the user interactions with the proxy tasks are provided to the task source from which they were drawn to natively apply to the modifications. In various aspects, an API or an intelligent agent will format the input for the tasks source to interpret the user's interactions in its native format. In other aspects, the user interaction will launch an application for manipulating the task source to apply user interactions directly to the task source. In some aspects, when a user interaction to a proxy task is communicated to its originating task source, the task list service 120 will request an update from that task source to learn of the effects to the task item and any related task items on that task source affected by the modification. Method 1100 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 12:
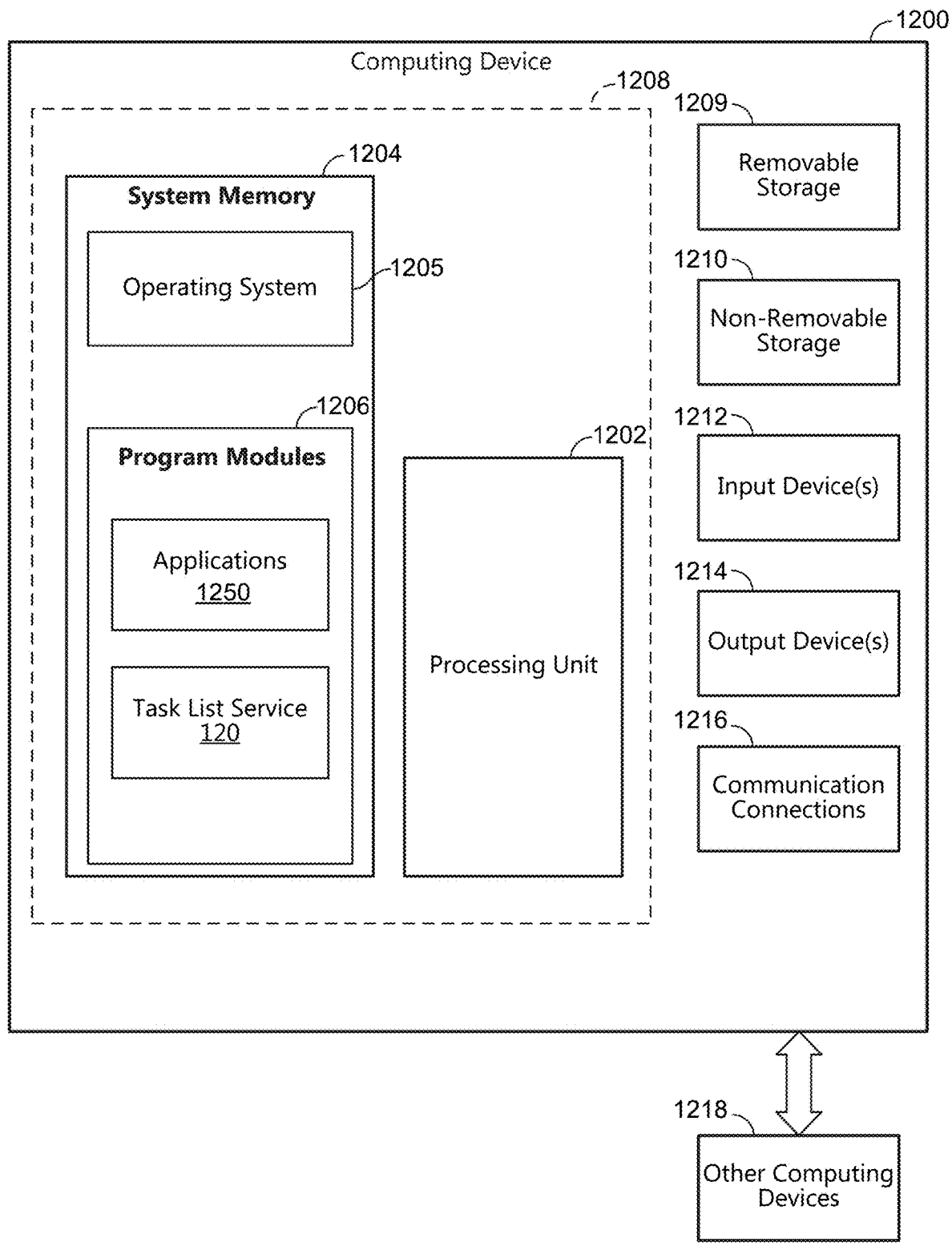
FIG. 12 is a block diagram illustrating example physical components of a computing device.
Figure 13A:
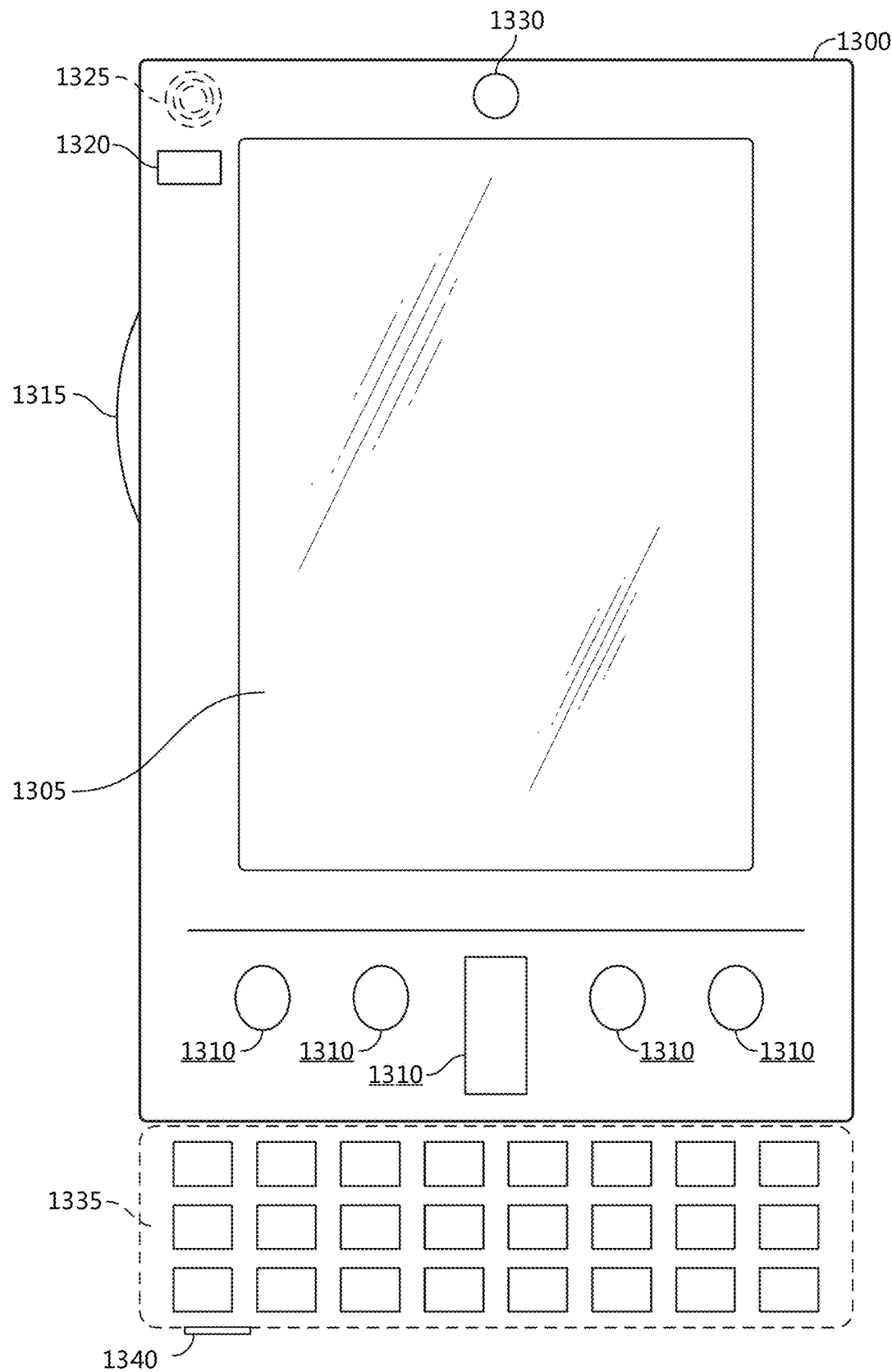
FIGS. 13A and 13B are block diagrams of a mobile computing device.
Figure 13B:
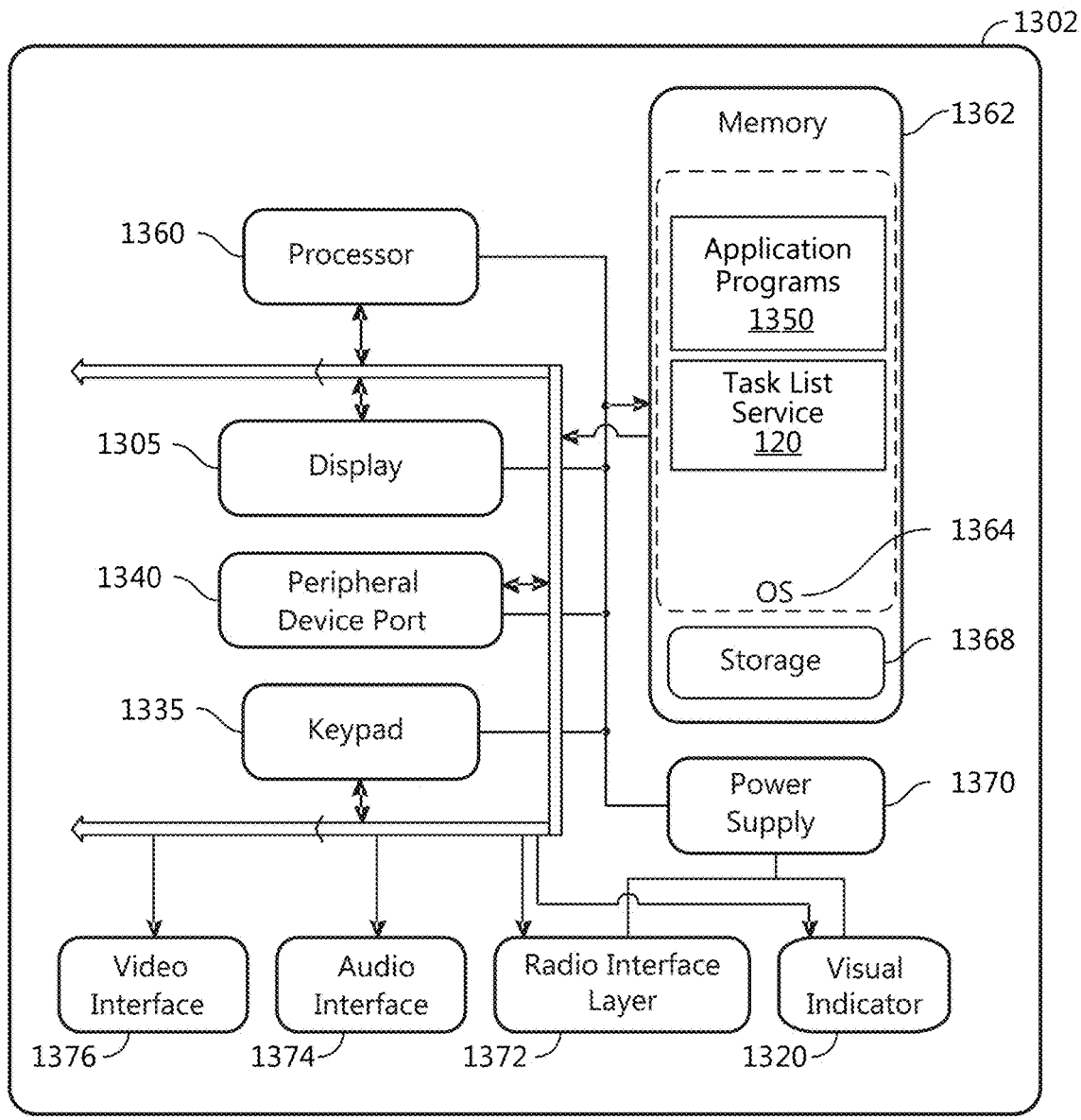
Figure 14:
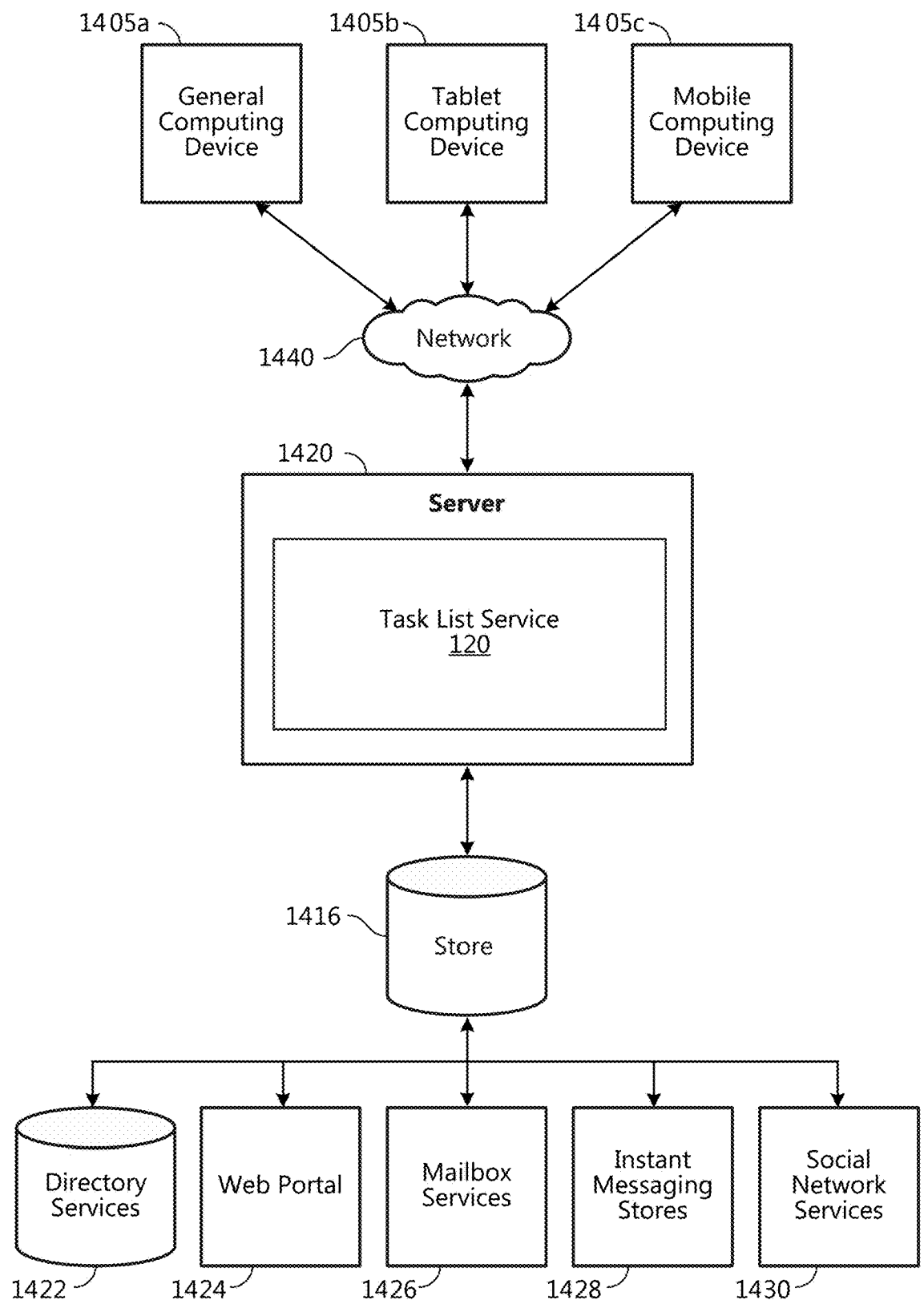
FIG. 14 is a block diagram of a distributed computing system.

FIGS. 12-14 and the associated descriptions provide a discussion of a variety of operating environments in which examples are practiced. However, the devices and systems illustrated and discussed with respect to FIGS. 12-14 are for purposes of example and illustration and are not limiting of a vast number of computing device configurations that are utilized for practicing aspects, described herein.

FIG. 12 is a block diagram illustrating physical components (i.e., hardware) of a computing device 1200 with which examples of the present disclosure may be practiced. In a basic configuration, the computing device 1200 includes at least one processing unit 1202 and a system memory 1204. According to an aspect, depending on the configuration and type of computing device, the system memory 1204 comprises, but is not limited to, volatile storage (e.g., random access memory), non-volatile storage (e.g., read-only memory), flash memory, or any combination of such memories. According to an aspect, the system memory 1204 includes an operating system 1205 and one or more program modules 1206 suitable for running software applications 1250. According to an aspect, the system memory 1204 includes the task list service 120. The operating system 1205, for example, is suitable for controlling the operation of the computing device 1200. Furthermore, aspects are practiced in conjunction with a graphics library, other operating systems, or any other application program, and are not limited to any particular application or system. This basic configuration is illustrated in FIG. 12 by those components within a dashed line 1208. According to an aspect, the computing device 1200 has additional features or functionality. For example, according to an aspect, the computing device 1200 includes additional data storage devices (removable and/or non-removable) such as, for example, magnetic disks, optical disks, or tape. Such additional storage is illustrated in FIG. 12 by a removable storage device 1209 and a non-removable storage device 1210.

As stated above, according to an aspect, a number of program modules and data files are stored in the system memory 1204. While executing on the processing unit 1202, the program modules 1206 (e.g., task list service 120) perform processes including, but not limited to, one or more of the stages of the method 1100 illustrated in FIG. 11. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 1200 has one or more input device(s) 1212 such as a keyboard, a mouse, a pen, a sound input device, a touch input device, etc. The output device(s) 1214 such as a display, speakers, a printer, etc. are also included according to an aspect. The aforementioned devices are examples and others may be used. According to an aspect, the computing device 1200 includes one or more communication connections 1216 allowing communications with other computing devices 1218. Examples of suitable communication connections 1216 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. According to an aspect, any such computer storage media is part of the computing device 1200. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 13A and 13B illustrate a mobile computing device 1300, for example, a mobile telephone, a smart phone, a tablet personal computer, a laptop computer, and the like, with which aspects may be practiced. With reference to FIG. 13A, an example of a mobile computing device 1300 for implementing the aspects is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. According to an aspect, the display 1305 of the mobile computing device 1300 functions as an input device (e.g., a touch screen display). If included, an optional side input element 1315 allows further user input. According to an aspect, the side input element 1315 is a rotary switch, a button, or any other type of manual input element. In alternative examples, mobile computing device 1300 incorporates more or fewer input elements. For example, the display 1305 may not be a touch screen in some examples. In alternative examples, the mobile computing device 1300 is a portable phone system, such as a cellular phone. According to an aspect, the mobile computing device 1300 includes an optional keypad 1335. According to an aspect, the optional keypad 1335 is a physical keypad. According to another aspect, the optional keypad 1335 is a "soft" keypad generated on the touch screen display. In various aspects, the output elements include the display 1305 for showing a graphical user interface (GUI), a visual indicator 1320 (e.g., a light emitting diode), and/or an audio transducer 1325 (e.g., a speaker). In some examples, the mobile computing device 1300 incorporates a vibration transducer for providing the user with tactile feedback. In yet another example, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1300 incorporates peripheral device port 1340, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one example of a mobile computing device. That is, the mobile computing device 1300 incorporates a system (i.e., an architecture) 1302 to implement some examples. In one example, the system 1302 is implemented as a "smart phone" capable of running one or more applications (e.g., browser, e-mail, calendaring, contact managers, messaging clients, games, and media clients/players). In some examples, the system 1302 is integrated as a computing device, such as an integrated personal digital assistant (PDA) and wireless phone.

According to an aspect, one or more application programs 1350 are loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. According to an aspect, the task list service 120 is loaded into memory 1362. The system 1302 also includes a non-volatile storage area 1368 within the memory 1362. The non-volatile storage area 1368 is used to store persistent information that should not be lost if the system 1302 is powered down. The application programs 1350 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 1300.

According to an aspect, the system 1302 has a power supply 1370, which is implemented as one or more batteries. According to an aspect, the power supply 1370 further includes an external power source, such as an AC adapter or a powered docking cradle that supplements or recharges the batteries.

According to an aspect, the system 1302 includes a radio 1372 that performs the function of transmitting and receiving radio frequency communications. The radio 1372 facilitates wireless connectivity between the system 1302 and the "outside world," via a communications carrier or service provider. Transmissions to and from the radio 1372 are conducted under control of the operating system 1364. In other words, communications received by the radio 1372 may be disseminated to the application programs 1350 via the operating system 1364, and vice versa.

According to an aspect, the visual indicator 1320 is used to provide visual notifications and/or an audio interface 1374 is used for producing audible notifications via the audio transducer 1325. In the illustrated example, the visual indicator 1320 is a light emitting diode (LED) and the audio transducer 1325 is a speaker. These devices may be directly coupled to the power supply 1370 so that when activated, they remain on for a duration dictated by the notification mechanism even though the processor 1360 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer 1325, the audio interface 1374 may also be coupled to a microphone to receive audible input, such as to facilitate a telephone conversation. According to an aspect, the system 1302 further includes a video interface 1376 that enables an operation of an on-board camera 1330 to record still images, video stream, and the like.

According to an aspect, a mobile computing device 1300 implementing the system 1302 has additional features or functionality. For example, the mobile computing device 1300 includes additional data storage devices (removable and/or non-removable) such as, magnetic disks, optical disks, or tape. Such additional storage is illustrated in FIG. 13B by the non-volatile storage area 1368.

According to an aspect, data/information generated or captured by the mobile computing device 1300 and stored via the system 1302 are stored locally on the mobile computing device 1300, as described above. According to another aspect, the data are stored on any number of storage media that are accessible by the device via the radio 1372 or via a wired connection between the mobile computing device 1300 and a separate computing device associated with the mobile computing device 1300, for example, a server computer in a distributed computing network, such as the Internet. As should be appreciated such data/information are accessible via the mobile computing device 1300 via the radio 1372 or via a distributed computing network. Similarly, according to an aspect, such data/information are readily transferred between computing devices for storage and use according to well-known data/information transfer and storage means, including electronic mail and collaborative data/information sharing systems.

FIG. 14 illustrates one example of the architecture of a system for improving the efficiency of managing task lists as described above. Content developed, interacted with, or edited in association with the task list service 120 is enabled to be stored in different communication channels or other storage types. For example, various documents may be stored using a directory service 1422, a web portal 1424, a mailbox service 1426, an instant messaging store 1428, or a social networking site 1430. The task list service 120 is operative to use any of these types of systems or the like for improving efficiency of task list management, as described herein. According to an aspect, a server 1420 provides the task list service 120 to clients 1405*a,b,c*. As one example, the server 1420 is a web server providing the task list service 120 over the web. The server 1420 provides the task list service 120 over the web to clients 1405 through a network 1440. By way of example, the client computing device is implemented and embodied in a personal computer 1405*a*, a tablet computing device 1405*b* or a mobile computing device 1405*c* (e.g., a smart phone), or other computing device. Any of these examples of the client computing device are operable to obtain content from the store 1416.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing a unified interface of a task listing service for accessing and manipulating task items retrieved from multiple task sources, comprising:

establishing communication with a plurality of different user-accessed task sources for a specific user, wherein the user-accessed task sources include at least one of: an email service, a calendar service and a productivity service;

discovering from the plurality of different user-accessed task sources a first item created by a first one of the plurality of different user-accessed task sources and a second item created by a second one of the plurality of different user-accessed task sources;

creating a first task based on the first item, wherein the first task is associated with the first item and owned by the first one of the plurality of different user-accessed task sources and creating a second task based on the second item, wherein the second task is associated with the second item and owned by the second one of the plurality of different user-accessed task sources;

creating a first proxy task based on and associated with the first task, and creating a second proxy task based on and associated with the second task;

displaying the first and second proxy tasks in a unified interface of a task listing service and displaying in the unified interface a first selectable link and a second selectable link associated with the first and second proxy tasks, respectively; and receiving a user-selection of at least one of the first link and the second link; and responsive to the user-selection, launching, via the first link or the second link, the first one or the second one of the plurality of different user-accessed task sources, respectively.

2. The method of claim 1, wherein establishing communication with the plurality of different task sources further comprises:

providing authentication credentials for the specific user to access each task source of the plurality of different task sources.

3. The method of claim 2, wherein the authentication credentials grant the specific user access to one or more proxy tasks associated with the specific user and one or more proxy tasks associated with other users who have granted the specific user permission to view the one or more proxy tasks associated with the other users.

4. The method of claim 1, wherein discovering the first and second items includes parsing one or more items created by each of the first one and the second one of the plurality of different user-accessed task sources to heuristically determine the first and second items based on content of the items.

5. The method of claim 1, further comprising:

receiving a user interaction with at least one of the first and second proxy tasks via the unified interface;

transmitting the user interaction to the first one or the second one of the plurality of different user-accessed task sources, respectively;

requesting an update on the first or second tasks from the first one or the second one of the plurality of different user-accessed task sources, respectively; and in response to receiving the update, updating the first or second proxy tasks, respectively, in the unified interface.

6. The method of claim 1, wherein displaying the first and second proxy tasks in the unified interface includes displaying a hyperlink to access the first or second items, respectively, in the first one or the second one of the plurality of different user-accessed task sources, respectively.

7. A system for providing a unified interface of a task listing service for accessing and manipulating task items retrieved from multiple task sources, comprising:

a processor; and a memory storage device including instructions that when executed by the processor enable the system to:

establish communication with a plurality of different user-accessed task sources for a specific user, wherein the user-accessed task sources include at least one of: an email service, a calendar service and a productivity service;

discover from the plurality of different user-accessed task sources a first item created by a first one of the plurality of different user-accessed task sources and a second item created by a second one of the plurality of different user-accessed task sources;

create a first task based on the first item, wherein the first task is associated with the first item and owned by the first one of the plurality of different user-accessed task sources and create a second task based on the second item, wherein the second task is associated with the second item and owned by the second one of the plurality of different user-accessed task sources;

create a first proxy task based on and associated with the first task, and create a second proxy task based on and associated with the second task;

display the first and second proxy tasks in a unified interface of a task listing service and display in the unified interface a first selectable link and a second selectable link associated with the first and second proxy tasks, respectively; and receive a user-selection of at least one of the first link and the second link; and responsive to the user-selection, launch, via the first link or the second link, the first one or the second one of the plurality of different user-accessed task sources, respectively.

8. The system of claim 7, wherein to establish communication with the plurality of different task sources the system is further enabled to:

provide authentication credentials for the specific user to access each task source of the plurality of different task sources.

9. The system of claim 8, wherein the authentication credentials grant the specific user access to one or more proxy tasks associated with the specific user and one or more proxy tasks associated with other users who have granted the specific user permission to view the one or more proxy tasks associated with the other users.

10. The system of claim 7, wherein to discover of the first and second items the system is further enabled to parse one or more items created by each of the first one and the second one of the plurality of different user-accessed task sources to heuristically determine the first and second items based on content of the items.

11. The system of claim 7, wherein, responsive to the user-interaction, the system is further enabled to:

receive a user interaction with at least one of the first and second proxy tasks via the unified interface;

transmit the user interaction to first one or the second one of the plurality of different user-accessed task sources, respectively;

request an update on the first or second tasks from the first one or the second one of the plurality of different user-accessed task sources, respectively; and in response to receiving the update, update the first or second proxy tasks, respectively, in the unified interface.

12. The system of claim 7, wherein, to display the first and second proxy tasks in the unified interface, the system is further enabled to display a hyperlink to access the first or second items, respectively, in the first one or the second one of the plurality of different user-accessed task sources, respectively.

13. A computer readable storage device including processor executable instructions for providing a unified interface of a task listing service for accessing and manipulating task items retrieved from multiple task sources, the processor executable instructions comprising:

establishing communication with a plurality of different user-accessed task sources for a specific user, wherein the user-accessed task sources include at least one of: an email service, a calendar service and a productivity service;

discovering from the plurality of different user-accessed task sources a first item created by a first one of the plurality of different user-accessed task sources and a second item created by a second one of the plurality of different user-accessed task sources;

creating a first task based on the first item, wherein the first task is associated with the first item and owned by the first one of the plurality of different user-accessed task sources and creating a second task based on the second item, wherein the second task is associated with the second item and owned by the second one of the plurality of different user-accessed task sources;

creating a first proxy task based on and associated with the first task, and creating a second proxy task based on and associated with the second task;

displaying the first and second proxy tasks in a unified interface of a task listing service and displaying in the unified interface a first selectable link and a second selectable link associated with the first and second proxy tasks, respectively; and receiving user-selection of at least one of the first link and the second link; and responsive to the user-selection, launching, via the first link or the second link, the first one or the second one of the plurality of different user-accessed task sources, respectively.

14. The computer readable storage device of claim 13, wherein establishing communication with the plurality of different task sources further comprises providing authentication credentials for the specific user to access each task source of the plurality of different task sources.

15. The computer readable storage device of claim 13, wherein discovering the first and second items includes parsing one or more items created by each of the first one and the second one of the plurality of different user-accessed task sources to heuristically determine the first and second items based on content of the items.

16. The computer readable storage device of claim 13, wherein, responsive to the user-interaction, additionally:
receiving a user interaction with at least one of the first and second proxy tasks via the unified interface;
transmitting the user interaction to the first one or the second one of the plurality of different user-accessed task sources, respectively;
requesting an update on the first or second tasks from the first one or the second one of the plurality of different user-accessed task sources, respectively; and
in response to receiving the update, updating the first or second proxy tasks, respectively, in the unified interface.

17. The computer readable storage device of claim 13, wherein displaying the first and second proxy tasks in the unified interface includes displaying a hyperlink to access the first or second items, respectively, in the first one or the second one of the plurality of different user-accessed task sources, respectively.

* * * * *